United States Patent
Inagaki et al.

(10) Patent No.: US 9,393,736 B2
(45) Date of Patent: Jul. 19, 2016

(54) METHOD OF MANUFACTURING STRETCHED FILM, DEVICE FOR MANUFACTURING STRETCHED FILM AND SYSTEM FOR MANUFACTURING STRETCHED FILM

(75) Inventors: Shinji Inagaki, Tokyo (JP); Daisuke Hojo, Tokyo (JP); Shimpei Hatakeyama, Tokyo (JP); Daisuke Ueno, Tokyo (JP); Hiroshi Nanbu, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/387,105

(22) PCT Filed: Mar. 30, 2012

(86) PCT No.: PCT/JP2012/058543
§ 371 (c)(1),
(2), (4) Date: Sep. 22, 2014

(87) PCT Pub. No.: WO2013/145251
PCT Pub. Date: Oct. 3, 2013

(65) Prior Publication Data
US 2015/0048549 A1 Feb. 19, 2015

(51) Int. Cl.
*B29C 55/04* (2006.01)
*B29C 55/12* (2006.01)
*B29K 23/00* (2006.01)
*B29K 105/00* (2006.01)
*B29L 7/00* (2006.01)
*B29L 11/00* (2006.01)
*B29K 1/00* (2006.01)

(52) U.S. Cl.
CPC ............. *B29C 55/045* (2013.01); *B29C 55/12* (2013.01); *B29K 2001/08* (2013.01); *B29K 2023/38* (2013.01); *B29K 2105/256* (2013.01); *B29K 2995/005* (2013.01); *B29K 2995/0018* (2013.01); *B29L 2007/002* (2013.01); *B29L 2011/00* (2013.01)

(58) Field of Classification Search
None
See application file for complete search history.

(56) References Cited

U.S. PATENT DOCUMENTS

2008/0157423 A1\* 7/2008 Wintrich et al. .............. 264/167
2009/0130341 A1\* 5/2009 Asada ........................... 428/1.1

FOREIGN PATENT DOCUMENTS

| JP | S 52-047070 A | 4/1977 |
|---|---|---|
| JP | 2006-159775 | 6/2006 |
| JP | 2006-224618 A | 8/2006 |
| JP | 2006-255892 A | 9/2006 |
| JP | 2008-080768 A | 4/2008 |
| JP | 4525326 B | 6/2010 |
| JP | 2010-221624 A | 10/2010 |

\* cited by examiner

*Primary Examiner* — Yogendra Gupta
*Assistant Examiner* — Kimberly A Stewart
(74) *Attorney, Agent, or Firm* — Lucas & Mercanti, LLP

(57) ABSTRACT

A film (F) is transported with one end side in a width direction moved relatively in a preceding manner and the other end side moved relatively in a delayed manner and thus the film (F) is stretched in an oblique direction with respect to the width direction. In the individual positions of the film (F) in the width direction, the film (F) is asymmetrically heated in the width direction such that the amount of displacement (ΔL) of an orientation angle from a desired angle caused by bowing (Bo) asymmetrically produced in the width direction by the stretching of the film (F) in the oblique direction is reduced, and thus a maximum value in the temperature distribution of the film (F) is present between a center portion in the width direction and any one of end portions.

21 Claims, 14 Drawing Sheets

METHOD OF MANUFACTURING STRETCHED FILM, DEVICE FOR MANUFACTURING STRETCHED FILM AND SYSTEM FOR MANUFACTURING STRETCHED FILM

CROSS REFERENCE TO RELATED APPLICATION

This Application is a 371 of PCT/JP2012/058543 filed on Mar. 30, 2012, which is incorporated herein by reference.

TECHNICAL FIELD

The present invention relates to a method of manufacturing a stretched film in which in a stretching zone, a film is stretched in an oblique direction with respect to a width direction, a device for manufacturing the stretched film in which the film is stretched in the oblique direction and a system for manufacturing the stretched film which includes such a manufacturing device.

BACKGROUND ART

Stretched films obtained by stretching resin are used as optical films that achieve various optical functions in various types of display devices, utilizing their optical anisotropy. For example, it is known that in a liquid crystal display device, the stretched film is used as an optical compensation film such as for optical compensation such as coloring prevention and wide viewing angle, and that the stretched film is adhered to a polarizer, and thus the stretched film is used as a retardation film which also functions as a polarizing plate protective film.

On the other hand, in recent years, as a new type of display device, much attention has been focused on self-luminous display devices such as an organic EL (electroluminescence) display device. In the self-luminous display device, there is a room for reduction of power consumption as compared with a liquid crystal display device in which a backlight is constantly on. Furthermore, in the self-luminous display device, such as the organic EL display device, in which light sources corresponding to individual colors are individually turned on, since it is not necessary to provide a color filter that is a factor for reducing a contrast, it is possible to further increase the contrast.

However, since in the organic EL display device, in order to increase the efficiency of taking out light, a reflective member such as an aluminum plate is provided on the back surface side of a display, external light entering the display is reflected off the reflective member, with the result that an image contrast is disadvantageously reduced.

Hence, it is known that in order to enhance a light and dark contrast through external light reflection prevention, the stretched film is adhered to a polarizer to form a circular polarizing plate, and the circular polarizing plate is used on the surface side of the display. Here, the circular polarizing plate is formed by adhering the polarizer to the stretched film such that the in-plane slow axis of the stretched film is inclined at a desired angle with respect to the transmission axis of the polarizer.

However, a general polarizer (polarizing film) is obtained by being stretched at high magnification in a transport direction, and its transmission axis is aligned with a width direction. Thus, a conventional retardation film is manufactured by vertical stretching or lateral stretching and, in principle, the in-plane slow axis is pointed in a direction at 0° or 90° with respect to the longitudinal direction of the film. Hence, in order to incline, at a desired angle, the transmission axis of the polarizer and the slow axis of the stretched film as described above, there is no choice but to adopt a batch method of cutting a long polarizing film and/or a stretched film into film pieces at a particular angle and of adhering the film pieces one by one. This disadvantageously results in poor productivity and low product yield due to attachment of shavings or the like.

In order to overcome this problem, there are proposed various methods for manufacturing a long retardation film that allows a film to be stretched in a direction at a desired angle (in an oblique direction) with respect to the longitudinal direction and that allows the direction of the slow axis to be controlled to be an arbitrary direction neither at 0° nor at 90° with respect to the longitudinal direction of the film. For example, in the manufacturing method disclosed in patent document 1, a resin film is fed out from a direction different from the winding direction of the film after the stretching of the resin film, and is transported with both end portions of the resin film held with a pair of holding members. The transport direction of the resin film is changed partway and thus the resin film is stretched in an oblique direction. In this way, a long stretched film is manufactured that has a slow axis at a desired angle more than 0° but less than 90° with respect to the longitudinal direction.

By use of such a stretched film having the slow axis inclined with respect to the longitudinal direction, it is possible to manufacture a circular polarizing plate by adhering a long polarizing film and a stretched film on a roll to roll basis instead of adhering by a conventional batch method. Consequently, the productivity of the circular polarizing plate is dramatically enhanced, and its yield is significantly improved.

Incidentally, when the film is stretched while being transported, it is known that bowing is produced. The bowing refers to a behavior in which a straight line drawn in the width direction of the film before stretching becomes concave or convex toward the longitudinal direction of the film after stretching. When the bowing described above is produced, since the orientation axis of the film is displaced from a desired angle, it is impossible to obtain a film having satisfactory optical properties.

In this point, patent document 1 discloses that, in order to remove the bowing described above, it is preferable to widen the distance between rails on which a pair of holding members travel after the stretching of the film and to stretch again the film in the width direction.

However, when the film is stretched in an oblique direction with respect to the width direction of the film, the pair of holding members which hold both end portions of the film travel in the transport direction of the film with one moving relatively in a preceding manner and the other moving relatively in a delayed manner. Since as described above, the pair of holding members asymmetrically travel in the width direction of the film, as shown in FIG. 14, bowing B' is asymmetrically produced in the width direction of a film F'. The asymmetrical bowing B' in the width direction described above cannot be removed by re-stretching, in the width direction, the film F' as disclosed in patent document 1, and consequently, it is impossible to reduce the displacement of an orientation angle from a desired angle over the width direction.

RELATED ART DOCUMENT

Patent Document

Patent document 1: Japanese Patent No. 4525326 (see paragraph [0049]).

DISCLOSURE OF THE INVENTION

Problems to be Solved by the Invention

In view of the foregoing conditions, an object of the present invention is to provide a method of manufacturing and a device for manufacturing a stretched film in which bowing that is asymmetrically produced in a width direction when a film is obliquely stretched is suppressed and in which thus the displacement of an orientation angle from a desired angle is reduced over the width direction, and also to provide a system for manufacturing a stretched film which includes such a manufacturing device.

Means for Solving the Problem

The above object of the present invention is achieved with the following configurations.

1. A method of manufacturing a stretched film, the method including: an oblique stretching step of transporting a film with one end side in a width direction moved relatively in a preceding manner and the other end side moved relatively in a delayed manner so as to stretch the film in an oblique direction with respect to the width direction, where the method of manufacturing a stretched film includes a step of heating the film in the width direction such that a temperature distribution is asymmetrical with respect to a center line in the width direction and that bowing produced asymmetrically in the width direction by stretching the film in the oblique direction is reduced, and the heating is performed such that a position where a temperature in the temperature distribution of the film at a time of the heating is maximized is present between a center portion in the width direction and any one of end portions.

2. The method of manufacturing a stretched film according to 1 described above, where the method of manufacturing a stretched film includes: a preheating step which is arranged on an upstream side with respect to the oblique stretching step and in which the film is transported with both ends of the film held until the oblique stretching step; and a heat-fixing step which is arranged on a downstream side with respect to the oblique stretching step and in which the film is transported with the both ends of the film held after the oblique stretching step, and the asymmetrical heating step is performed in at least either of the preheating step and the heat-fixing step.

3. The method of manufacturing a stretched film according to 2 described above, where the asymmetrical heating step is performed in at least the heat-fixing step.

4. The method of manufacturing a stretched film according to 3 described above, where in the asymmetrical heating step performed in the heat-fixing step, the film is heated such that the position where the temperature in the temperature distribution is maximized in the width direction of the film at the time of the heating is present between the center portion in the width direction and the end portion on the preceding side in the oblique stretching step.

5. The method of manufacturing a stretched film according to 2 described above, where the asymmetrical heating step is performed in at least the preheating step.

6. The method of manufacturing a stretched film according to 5 described above, where in the asymmetrical heating step performed in the preheating step, the film is heated before stretching of the film such that the position where the temperature in the temperature distribution is maximized in the width direction of the film at the time of the heating is present between the center portion in the width direction and the end portion on the delayed side in the oblique stretching step.

7. The method of manufacturing a stretched film according to 2 described above, where the asymmetrical heating step is performed both in the preheating step and in the heat-fixing step.

8. The method of manufacturing a stretched film according to 7 described above, where in the asymmetrical heating step performed in the heat-fixing step, the film is heated such that the position where the temperature in the temperature distribution is maximized in the width direction of the film at the time of the heating is present between the center portion in the width direction and the end portion on the preceding side in the oblique stretching step, and in the asymmetrical heating step performed in the preheating step, the film is heated before stretching of the film such that the position where the temperature in the temperature distribution is maximized in the width direction of the film at the time of the heating is present between the center portion in the width direction and the end portion on the delayed side in the oblique stretching step.

9. The method of manufacturing a stretched film according to any one of 1 to 8 described above, where the both end portions of the film in the width direction are held with holding members, the film is transported while the holding members are being moved, a direction in which the film is transported is changed partway such that the film is stretched in the oblique direction with respect to the width direction.

10. The method of manufacturing a stretched film according to any one of 1 to 9 described above, where the film is obliquely stretched while being transported at a speed of 15 m/min to 150 m/min.

11. A device for manufacturing a stretched film, the device including: an oblique stretching portion that transports a film with one end side in a width direction moved relatively in a preceding manner and the other end side moved relatively in a delayed manner so as to be able to stretch the film in an oblique direction with respect to the width direction, where the device for manufacturing a stretched film includes a heating portion that can heat the film in the width direction such that a temperature distribution is asymmetrical with respect to a center line in the width direction and that bowing produced asymmetrically with respect to the film in the oblique stretching portion can be reduced, and the heating portion is arranged such that a position where a temperature in the temperature distribution of the film at a time of the heating is maximized is present between a center portion in the width direction and any one of end portions.

12. The device for manufacturing a stretched film according to 11 described above, where the manufacturing device includes: a preheating portion which is arranged on an upstream side with respect to the oblique stretching portion and in which the film can be transported with both ends of the film held until the oblique stretching portion; and a heat-fixing portion which is arranged on a downstream side with respect to the oblique stretching portion and in which the film can be transported with the both ends of the film held after the oblique stretching portion, and the heating portion that can asymmetrically perform the heating is provided in at least either of the preheating portion and the heat-fixing portion.

13. The device for manufacturing a stretched film according to 12 described above, where the heating portion that can asymmetrically perform the heating is provided in at least the heat-fixing portion.

14. The device for manufacturing a stretched film according to 13 described above, where the heating portion provided in the heat-fixing portion is arranged in a position which allows the film to be heated such that the position where the temperature in the temperature distribution is maximized in the width direction of the film at the time of the heating is present between the center portion in the width direction and the end portion on the preceding side in the oblique stretching portion.

15. The device for manufacturing a stretched film according to 12 described above, where the heating portion that can asymmetrically perform the heating is provided in at least the preheating portion.

16. The device for manufacturing a stretched film according to 15 described above, where the heating portion provided in the preheating portion is arranged in a position which allows the film to be heated such that the position where the temperature in the temperature distribution is maximized in the width direction of the film at the time of the heating is present between the center portion in the width direction and the end portion on the delayed side in the oblique stretching portion.

17. The device for manufacturing a stretched film according to 12 described above, where the heating portion that can asymmetrically perform the heating is provided both in the preheating portion and in the heat-fixing portion.

18. The device for manufacturing a stretched film according to 17 described above, where the heating portion provided in the preheating portion is arranged in a position which allows the film to be heated such that the position where the temperature in the temperature distribution is maximized in the width direction of the film at the time of the heating is present between the center portion in the width direction and the end portion on the delayed side in the oblique stretching portion, and the heating portion provided in the heat-fixing portion is arranged in a position which allows the film to be heated such that the position where the temperature in the temperature distribution is maximized in the width direction of the film at the time of the heating is present between the center portion in the width direction and the end portion on the preceding side in the oblique stretching portion.

19. The device for manufacturing a stretched film according to any one of 11 to 18 described above, where the both end portions of the film in the width direction are held with holding members, the film is transported while the holding members are being moved, a direction in which the film is transported is changed partway such that the film can be stretched in the oblique direction with respect to the width direction.

20. A system for manufacturing a stretched film, the system including: the device for manufacturing a stretched film according to any one of 11 to 19 described above; a film dispensing portion that dispenses a film which is a target of stretching to the device for manufacturing a stretched film; and a winding portion that winds the stretched film obtained by the device for manufacturing a stretched film.

Advantages of the Invention

In a process of manufacturing a stretched film including an oblique stretching step, a film is asymmetrically heated in width direction, and thus it is possible to reduce bowing asymmetrically produced in the width direction by stretching the film in an oblique direction. In this way, even when the stretched film is obtained by the oblique stretching step, it is possible to obtain the stretched film having satisfactory optical properties in which orientation angles are aligned to be the desired angle over the width direction.

BEST MODE FOR CARRYING OUT THE INVENTION

Figure 1:
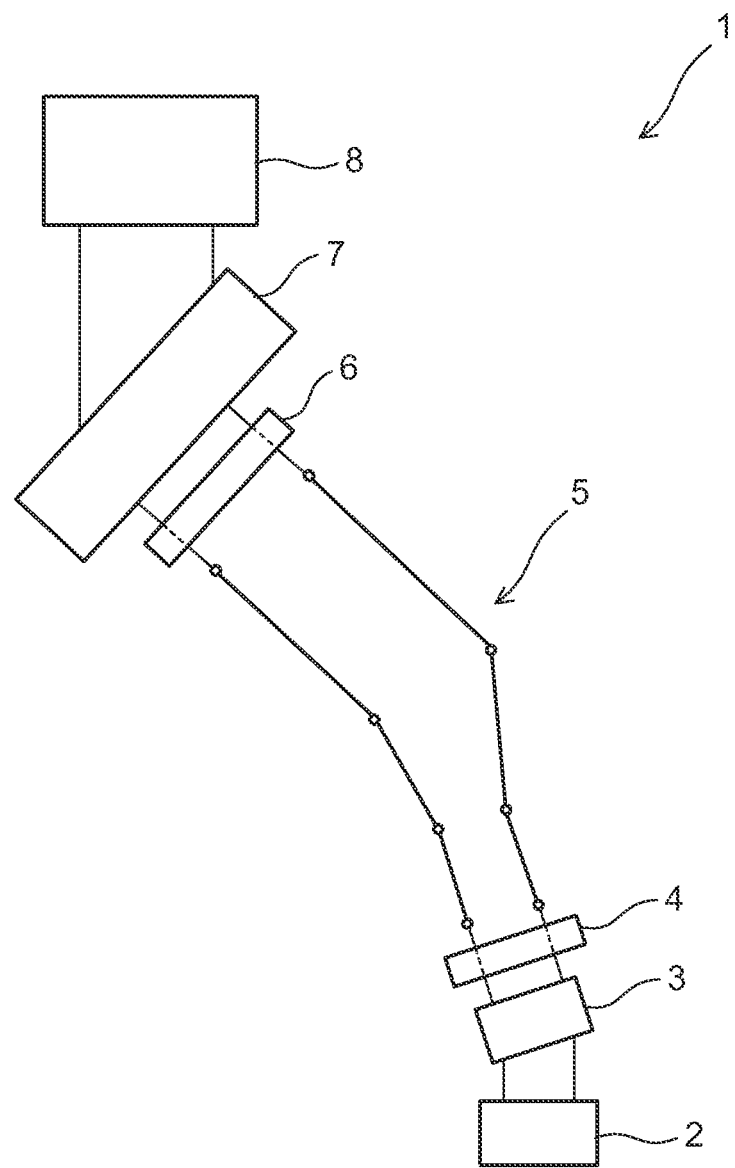
FIG. 1 A plan view schematically showing an outline configuration of an obliquely stretched long film manufacturing system according to an embodiment of the present invention.

Although an embodiment of the present invention will be described in detail below, the present invention is not limited to such an embodiment. In the following description, when it is not necessary to distinguish a film before stretching from a film after stretching, these are collectively mentioned as a "film" whereas when both of them are distinguished from each other, the former may be mentioned as a "long film" or a "film before stretching", and the latter may be mentioned as a "stretched film" or a "film after stretching".

A method of manufacturing a stretched film (long stretched film) according to the present embodiment is a method of, by stretching a long film obliquely, manufacturing a stretched film having an in-plane slow axis at an arbitrary angle with respect to the width direction of the film after stretching.

Here, a "long" film refers to a film that has a length at least about five times the width of the film, and preferably a length ten or more times the width, and can specifically be one that has such a length as to be wound in the shape of a roll and to be stored or transported (a film roll). In the method of manufacturing a long film, it is possible, by continuously manufacturing the film, to manufacture the film having a desired arbitrary length. As the method of manufacturing a long stretched film, a method may be adopted of forming a long film, then once winding it around a core into a wound member (a full-width long film roll), and then feeding the long film from the wound member to an oblique stretching step to manufacture an obliquely stretched film, or a may be adopted of, without winding up the long film after film formation, feeding it from the film formation step continuously to the oblique stretching step to manufacture an obliquely stretched film. Continuously performing the film formation step and the oblique stretching step is preferable because it is possible to feed back the results of the film thickness and optical values of the stretched film to change the film formation conditions and thereby obtain a desired long stretched film.

In the method of manufacturing a long stretched film according to the present embodiment, a long stretched film having a slow axis at an angle more than 0° but less than 90° with respect to the width direction of the film is manufactured. Here, the angle with respect to the width direction of the film is an angle in the plane of the film. Since s slow axis normally occurs in the stretching direction or in a direction perpendicular to the stretching direction, in the method according to the present embodiment, by performing stretching at an angle more than 0° but less than 90° with respect to the width direction of the film, it is possible to manufacture a long stretched film having such a slow axis. The angle formed between the width direction of the long stretched film and the slow axis, that is, the orientation angle, can be arbitrarily set at a desired angle in the range of more than 0° but less than 90°.

As a result of intensive studies performed to achieve the above object, the inventors have found that the object can be achieved by asymmetrically heating the film in the width direction. Further studies based on the findings have led to the completion of the present invention.

Specifically, in an embodiment according to the present invention, there is provided a method of manufacturing a stretched film, the method including: an oblique stretching step of transporting a film with one end side in a width direction moved relatively in a preceding manner and the other end side moved relatively in a delayed manner so as to stretch the film in an oblique direction with respect to the width direction, where the method of manufacturing a stretched film includes a step of heating the film in the width direction such that a temperature distribution is asymmetrical with respect to a center line in the width direction and that bowing produced asymmetrically in the width direction by stretching the film in the oblique direction is reduced, and the heating is performed such that a position where a temperature in the temperature distribution of the film at a time of the heating is maximized is present between a center portion in the width direction and any one of end portions.

In an embodiment according to the present invention, there is provided a device for manufacturing a stretched film, the device including: an oblique stretching portion that transports a film with one end side in a width direction moved relatively in a preceding manner and the other end side moved relatively in a delayed manner so as to be able to stretch the film in an oblique direction with respect to the width direction, where the device for manufacturing a stretched film includes a heating portion that can heat the film in the width direction such that a temperature distribution is asymmetrical with respect to a center line in the width direction and that bowing produced asymmetrically with respect to the film in the oblique stretching portion can be reduced, and the heating portion is arranged such that a position where a temperature in the temperature distribution of the film at a time of the heating is maximized is present between a center portion in the width direction and any one of end portions.

<Long Film>

A long film as a target of stretching in the present embodiment will first be described.

There is no particular restriction on a long film as a target of stretching by a device (described in detail later) for manufacturing a stretched film according to the present embodiment. As long as the film is formed of thermoplastic resin, any film can be used; for example, when the stretched film is used for optical applications, a film that is transparent at desired wavelengths is preferably used. Examples of such a resin include polycarbonate resin, polyether sulfone resin, polyethylene terephthalate resin, polyimide resin, polymethyl methacrylate resin, polysulfone resin, polyarylate resin, polyethylene resin, polyvinyl chloride resin, olefin polymer resin having an alicyclic structure (alicyclic olefin polymer resin) and cellulose ester resin.

Among these, from the viewpoints of transparency, mechanical strength and the like, polycarbonate resin, alicyclic olefin polymer resin and cellulose ester resin are preferably used. Among these, for easy of adjustment of a retardation at the time of formation into an optical film, alicyclic olefin polymer resin and cellulose ester resin are preferably used. Accordingly, the compositions of alicyclic olefin polymer resin and cellulose ester resin will be discussed below.

[Alicyclic Olefin Polymer Resin]

Examples of alicyclic olefin polymer resin include cyclic olefin random multicomponent copolymers disclosed in Japanese Patent Application Publication No. H05-310845, hydrogenated polymers disclosed in Japanese Patent Application Publication No. H05-97978, and thermoplastic dicyclopentadiene ring-opening polymers and hydrogenated products thereof disclosed in Japanese Patent Application Publication No. H11-124429.

Alicyclic olefin polymer resin will be described more specifically. Alicyclic olefin polymer resin is a polymer having an alicyclic structure such as a saturated alicyclic hydrocarbon (cycloalkane) structure or an unsaturated alicyclic hydrocarbon (cycloalkene) structure. There is no particular restriction on the number of carbon atoms constituting the alicyclic structure; however, with the number of carbon atoms normally in the range of 4 to 30, preferably in the range of 5 to 20, and more preferably in the range of 5 to 15, an excellent balance of mechanical strength, heat resistance, and film moldability is preferably obtained.

The proportion of the repeating units containing the alicyclic structure in alicyclic olefin polymer resin is selected as necessary but is preferably 55% by weight or more, more preferably 70% by weight or more, and particularly preferably 90% by weight or more. With the proportion of the repeating units in those ranges, an optical material, such as a retardation film, obtained from the obliquely stretched long film (hereinafter also referred to as the stretched film) according to the present embodiment preferably has enhanced transparency and heat resistance.

Examples of alicyclic olefin polymer resin include norbornene resin, monocyclic olefin resin, cyclic conjugated diene resin, vinyl alicyclic hydrocarbon resin, and hydrogenated products thereof. Among these, norbornene resin is preferably used for satisfactory transparency and moldability.

Examples of norbornene resin include a ring-opening polymer of a monomer having a norbornene structure, a ring-opening copolymer of a monomer having a norbornene structure and another monomer, a hydrogenated product of those; and an addition polymer of a monomer having a norbornene structure, an addition copolymer of a monomer having a norbornene structure and another monomer, and a hydrogenated product of those and the like. Among these, a hydrogenated product of a ring-opening (co)polymer of a monomer having a norbornene structure is particularly preferably used from the viewpoints of transparency, moldability, heat resistance, low hygroscopicity, dimensional stability, light weight and the like.

Examples of monomers having a norbornene structure include bicyclo[2.2.1]hept-2-ene (with the trivial name norbornene), tricyclo[4.3.0.12,5]deca-3,7-diene (with the trivial name dicyclopentadiene), 7,8-benzotricyclo[4.3.0.12,5]deca-3-ene (with the trivial name methanotetrahydrofluorene), tetracyclo[4.4.0.12,5.17.10]dodeca-3-ene (with the trivial name tetracyclododecene), and derivatives of these compounds (for example, those having a substituent group on the ring). Here, examples of the substituent group include alkyl group, alkylene group, and polar groups. Of these substituent groups, a plurality of the same species or different species can be bonded to the ring. A single species of monomer having a norbornene structure can be used alone, or two or more species of such monomers can be used in combination.

Examples of polar groups include heteroatoms and atomic groups including heteroatoms. Examples of heteroatoms include an oxygen atom, a nitrogen atom, a sulfur atom, a silicon atom and halogen atoms. Specific examples of polar groups include a carboxyl group, a carbonyloxylcarbonyl group, an epoxy group, a hydroxyl group, an oxy group, an ester group, a silanol group, a silyl group, an amino group, a nitryl group and a sulfone group.

Example of other monomers capable of ring-opening copolymerization with a monomer having a norbornene structure include monocyclic olefins, such as cyclohexene, cycloheptene and cyclooctene and derivatives thereof; and cyclic conjugated dienes, such as cyclohexadiene and cycloheptadiene and derivatives thereof A ring-opening polymer of a monomer having a norbornene structure and a ring-opening copolymer of a monomer having a norbornene structure and another monomer capable of copolymerization therewith, can be obtained through (co)polymerization of the monomers in the presence of a well-known ring-opening copolymerization catalyst.

Examples of other monomers capable of addition copolymerization with a monomer having a norbornene structure include α-olefins with carbon numbers of 2 to 20, such as ethylene, propylene and 1-butene and derivatives thereof; cycloolefins, such as cyclobutene, cyclopentene and cyclohexene and derivatives thereof; and non-conjugated dienes, such as 1,4-hexadiene, 4-methyl-1,4-hexadiene and 5-methyl-1,4-hexadiene. Of these monomers, a single species can be used alone, or two or more species can be used in combination. Among those, an α-olefin is preferably used, and ethylene is more preferably used.

An addition polymer of a monomer having a norbornene structure and an addition copolymer of a monomer having a norbornene structure and another monomer capable of copolymerization therewith, can be obtained through (co)polymerization of the monomers in the presence of a well-known addition copolymerization catalyst.

A hydrogenated product of a ring-opening monomer having a norbornene structure, a hydrogenated product of a ring-opening copolymer of a monomer having a norbornene structure and another monomer capable of copolymerization therewith, a hydrogenated product of an addition polymer of a monomer having a norbornene structure, a hydrogenated product of an addition copolymer of a monomer having a norbornene structure and another monomer capable of copolymerization therewith, can be obtained by adding a well-known hydrogenation catalyst containing a transition metal, such as nickel or palladium, to a solution of those polymers and hydrogenating preferably 90% or more of the unsaturated carbon-carbon bonds.

Preferable norbornene resins are those having, as repeating units, an X:bicyclo[3.3.0]octane-2,4-diyl-ethylene structure and a Y:tricyclo[4.3.0.12,5]decane-7,9-diyl-ethylene structure, where the content of those repeating units is 90% by weight or more out of all the repeating units of the norbornene resin and the ratio X:Y of the X content to the Y content by weight is 100:0 to 40:60. When such a resin is used, an optical material obtained from the stretched film according to the present embodiment exhibits no dimensional change for a long period and offers excellent stability in optical properties.

The molecular weight of the norbornene resin can be selected to suit the purpose of usage, and is, in terms of a polyisoprene-equivalent (or, where toluene is used as a solvent, polystyrene-equivalent) weight-average molecular weight (Mw) as measured by gel permeation chromatography using cyclohexane (or, where the thermoplastic resin does not dissolve in it, toluene) as a solvent, generally in the range of 10,000 to 100,000, preferably 15,000 to 80,000, and more preferably 20,000 to 50,000. With the weight-average molecular weight in those ranges, an optical material obtained from the stretched film according to the present embodiment preferably offers an excellent balance of mechanical strength and formability.

The glass transition temperature of the norbornene resin can be selected to suit the purpose of usage, and is preferably 80° C. or more, and more preferably in the range of 100 to 250° C. With the glass transition temperature in those ranges, an optical material obtained from the stretched film according to the present embodiment develops no deformation or stress during use under high temperatures, and exhibits excellent durability.

The molecular weight distribution (weight-average molecular weight (Mw)/number-average molecular weight (Mn)) of the norbornene resin is not particularly limited but is generally in the range of 1.0 to 10.0, preferably in the range of 1.1 to 4.0 and more preferably in the range of 1.2 to 3.5.

The absolute value of the photoelastic coefficient C of the norbornene resin is preferably $10 \times 10^{-12}$ $Pa^{-1}$ or less, more preferably $7 \times 10^{-12}$ $Pa^{-1}$ or less and particularly preferably $4 \times 10^{-12}$ $Pa^{-1}$ or less. The photoelastic coefficient C is a value given by $C = \Delta n/\sigma$, where $\Delta n$ represents birefringence and $\sigma$ represents stress. With the photoelastic coefficient C of the thermoplastic resin within those ranges, the film has less variation of retardation Ro in the in-plane direction of the film as will be described later.

The thermoplastic resin used in the present embodiment may be blended with appropriate amounts of any of additives such as a colorant, like a pigment or a dye, a fluorescent brightener, a dispersant, a heat stabilizer, a light stabilizer, an ultraviolet absorber, an antistat, an antioxidant, a lubricant, and a solvent.

The content of residual volatile components in the stretched film of the norbornene resin is subject to no particular restriction, but is preferably 0.1% by weight or less, further preferably 0.05% by weight or less and particularly preferably 0.02% by weight or less. With the content of residual volatile components in those ranges, improved dimensional stability is obtained, and the retardation Ro in the in-plane direction of the film and the retardation Rt in the film thickness direction have less secular variation. Moreover, it is possible to suppress deterioration of the retardation film obtained from the stretched film according to the present embodiment, and thus, when it is applied to a polarizing plate in a liquid crystal display device or to a circular polarizer plate in an organic EL display device, it is possible to maintain stable and satisfactory display for a long period. Residual volatile components are substances with molecular weights of 200 or less that are contained in minute amounts in the film, and include, for example, residual monomers and solvents. The content of residual volatile components can be quantitatively determined, as the total of substances with molecular weights of 200 or less contained in the film, through analysis of the film by gas chromatography.

The saturated water absorption of the stretched film of the norbornene resin is preferably 0.03% by weight or less, more preferably 0.02% by weight or less and particularly preferably 0.01% by weight or less. With the saturated water absorption within those ranges, the retardation Ro and Rt have less secular variation. It is also possible to suppress deterioration of a retardation film obtained from the stretched film according to the present embodiment, and when it is applied to a polarizing plate in a liquid crystal display device or to a circular polarizing plate in an organic EL display device, it is possible to maintain stable and satisfactory display for a long period.

The saturated water absorption is a percentage of the increase in the mass of a sample piece of the film after, as compared with before, the film is immersed in water at a given temperature for a given length of time. It is usually measured with the sample immersed in water at 23° C. for 24 hours. The saturated water absorption of the stretched film according to the present embodiment can be adjusted within the abovementioned ranges, for example, by reducing the amount of polar groups in the thermoplastic resin. It is, however, preferable that the resin contain no polar group.

Preferred methods of forming a film of the preferred norbornene resin as described above are solution flow casting (solution film formation) and melt flow casting (such as melt extrusion). Melt extrusion includes inflation using a die, and inflation using a T-die is preferred from the viewpoints of productivity and excellent thickness accuracy.

In extrusion using a T-die, by a method as disclosed in Japanese Patent Application Publication No. 2004-233604 for stably keeping thermoplastic resin in a melted state when brought into contact with a cooling drum, it is possible to manufacture a long film with satisfactorily small variations in optical properties such as retardation and orientation angle.

Specifically, examples of such methods include—(1) a method where, when a long film is manufactured by melt extrusion, thermoplastic resin in sheet form extruded from a die is drawn out in close contact with a cooling drum under a pressure of 50 kPa or less; (2) a method where, when a long film is manufactured by melt extrusion, the path from the die opening portion to the first-contact cooling drum with a cover member, and the distance from the cover member to the die opening portion or to the first-contact cooling drum is controlled to be 100 mm or less; (3) a method where, when a long film is manufactured by melt extrusion, the temperature in the atmosphere within 10 mm or less of thermoplastic resin in sheet form extruded from the die opening portion is raised to a predetermined temperature; and (4) a method where, when a long film is manufactured by melt extrusion, thermoplastic resin in sheet form extruded from the die opening portion is blown with a wind in which a difference of the speed with the drawing speed of the first-contact cooling drum is 0.2 m/s or less.

[Cellulose Ester Resin]

Examples of preferred cellulose ester resin films include those containing cellulose acylate fulfilling Formulas (1) and (2) below and in addition containing a compound expressed by General Formula (A) below.

$$2.0 \leq Z1 < 3.0 \qquad \text{Formula (1):}$$

$$0 \leq X < 3.0 \qquad \text{Formula (2):}$$

(In Formulas (1) and (2), Z1 represents the total degree of substitution by acyl group in cellulose acylate, and X represents the sum of the degrees of substitution by propionyl group and butyryl group in cellulose acylate.)

[Chemical Formula 1]

General Formula (A)

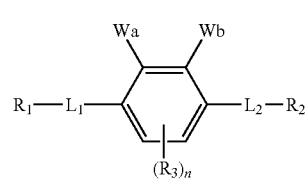

General Formula (A) will be described in detail below. In General Formula (A), $L_1$ and $L_2$ each independently represent a single-bond or divalent ligand. Examples of $L_1$ and $L_2$ include the following structures (where R represents a hydrogen atom or a substituent).

[Chemical Formula 2]

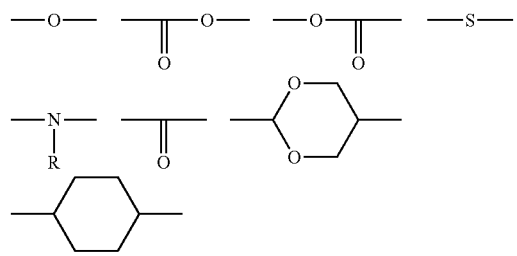

Preferred as $L_1$ and $L_2$ are —O—, —COO—, and —OCO—.

$R_1$, $R_2$, and $R_3$ each independently represent a substituent. Specific examples of substituents represented by $R_1$, $R_2$, and $R_3$ include halogen atoms (fluorine atom, chlorine atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecylcyclohexyl group, etc.), alkenyl groups (vinyl group, aryl group, etc.), cycloalkenyl groups (2-cyclopentene-1-yl, 2-cyclohexene-1-yl group, etc.), alkynyl groups (ethynyl group, propargyl group, etc.), aryl groups (phenyl group, p-tolyl group, naphthyl group, etc.), heterocyclic groups (2-furyl group, 2-thienyl group, 2-pyrimidinyl group, 2-benzothiazolyl group, etc.), cyano group, hydroxyl group, nitro group, carboxyl group, alkoxy groups (methoxy group, ethoxy group, isopropoxy group, tert-butoxy group, n-octyloxy group, 2-methoxyethoxy group, etc.), aryloxy groups (phenoxy group, 2-methylphenoxy group, 4-tert-butylphenoxy group, 3-nitrophenoxy group, 2-tetradecanoyl amino phenoxy group, etc.), acyloxy groups (formyloxy group, acetyloxy group, pivaroyloxy group, stearoyloxy group, benzoyloxy group, p-methoxyphenylcarbonyloxy group, etc.), amino groups (amino group, methylamino group, dimethylamino group, anilino group, N-methyl-anilino group, diphenylamino group, etc.), acylamino groups (formylamino group, acetylamino group, pivaroylamino group, lauroylamino group, benzoylamino group, etc.), alkyl and arylsulfonylamino groups (methylsulfonylamino group, butylsulfonylamino group, phenylsulfonylamino group, 2,3,5-trichlorophenylsulfonylamino group, p-methylphenylsulfonylamino group, etc.), mercapto group, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethylsulfamoyl group, N-(3-dodecyloxypropyl)sulfamoyl group, N,N-dimethylsulfamoyl group, N-acetylsulfamoyl group, N-benzoylsulfamoyl group, N—(N'phenylcarbamoyl)sulfamoyl group, etc.), sulfo group, acyl groups (acetyl group, pivaroylbenzoyl group, etc.), and carbamoyl groups (carbamoyl group, N-methylcarbamoyl group, N,N-dimethylcarbamoyl group, N,N-di-n-octylcarbamoyl group, N-(methylsulfonyl)carbamoyl group, etc.)

Preferred as $R_1$ and $R_2$ are substituted or non-substituted phenyl groups and substituted or non-substituted cyclohexyl groups, more preferably phenyl groups having a substituent and cyclohexyl groups having a substituent and particularly preferably phenyl groups having a substituent at position 4 and cyclohexyl groups having a substituent at position 4.

Preferred as $R_3$ are hydrogen atom, halogen atoms, alkyl groups, alkenyl groups, aryl groups, heterocyclic groups, hydroxyl group, carboxyl group, alkoxy groups, aryloxy groups, acyloxy groups, cyano group, and amino group, and more preferably hydrogen atom, halogen atoms, alkyl groups, cyano group and alkoxy groups.

Wa and Wb each represent a hydrogen atom or a substituent, where (I) Wa and Wb may be bonded together to form a ring; or
(II) at least one of Wa and Wb may form a ring structure; or
(III) at least one of Wa and Wb may be alkenyl group or alkynyl group.

Specific examples of substituents represented by Wa and Wb include halogen atoms (fluorine atom, chlorine atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecylcyclohexyl group, etc.), alkenyl groups (vinyl group, aryl group, etc.), cycloalkenyl groups (2-cyclopentene-1-yl, 2-cyclohexene-1-yl group, etc.), alkynyl groups (ethynyl group, propargyl group, etc.), aryl groups (phenyl group, p-tolyl group, naphthyl group, etc.), heterocyclic groups (2-furyl group, 2-thienyl group, 2-pyrimidinyl group, 2-benzothiazolyl group, etc.), cyano group, hydroxyl group, nitro group, carboxyl group, alkoxy groups (methoxy group, ethoxy group, isopropoxy group, tert-butoxy group, n-octyloxy group, 2-methoxyethoxy group, etc.), aryloxy groups (phenoxy group, 2-methylphenoxy group, 4-tert-butylphenoxy group, 3-nitrophenoxy group, 2-tetradecanoyl amino phenoxy group, etc.), acyloxy groups (formyloxy group, acetyloxy group, pivaroyloxy group, stearoyloxy group, benzoyloxy group, p-methoxyphenylcarbonyloxy group, etc.), amino groups (amino group, methylamino group, dimethylamino group, anilino group, N-methyl-anilino group, diphenylamino group, etc.), acylamino groups (formylamino group, acetylamino group, pivaroylamino group, lauroylamino group, benzoylamino group, etc.), alkyl and arylsulfonylamino groups (methylsulfonylamino group, butylsulfonylamino group, phenylsulfonylamino group, 2,3,5-trichlorophenylsulfonylamino group, p-methylphenylsulfonylamino group, etc.), mercapto group, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethylsulfamoyl group, N-(3-dodecyloxypropyl)sulfamoyl group, N,N-dimethylsulfamoyl group, N-acetylsulfamoyl group, N-benzoylsulfamoyl group, N—(N'phenylcarbamoyl)sulfamoyl group, etc.), sulfo group, acyl groups (acetyl group, pivaroylbenzoyl group, etc.), and carbamoyl groups (carbamoyl group, N-methylcarbamoyl group, N,N-dimethylcarbamoyl group, N,N-di-n-octylcarbamoyl group, N-(methylsulfonyl)carbamoyl group, etc.).

The above substituents may further be substituted with the above groups.

(I) In a case where Wa and Wb are bonded together to form a ring, it is preferable that the ring be a nitrogen-containing five-membered ring or a sulfur-containing five-membered ring. It is particularly preferable that the compound expressed by General Formula (A) be a compound expressed by General Formula (1) or (2) below.

[Chemical Formula 3]

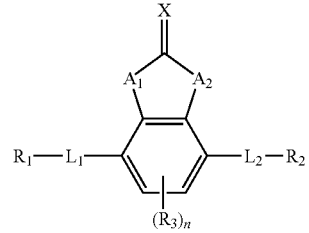

General Formula (1)

In General Formula (1), $A_1$ and $A_2$ each independently represent —O—, —S—, —NRx- (where Rx represent a hydrogen atom or a substituent), or —CO—. Examples of substituents represented by Rx are the same as the specific examples of substituents represented by above-mentioned Wa and Wb. Preferred for Rx is a hydrogen atom, an alkyl group, an aryl group, or a heterocyclic group.

In General Formula (1), X represents a non-metallic atom of an element of groups 14 to 16. Preferred for X is =O, =S, =NRc, or =C(Rd)Re. Here, Rc, Rd and Re each represent a substituent, of which examples are the same as the specific examples of substituents represented by above-mentioned Wa and Wb. $L_1$, $L_2$, $R_1$, $R_2$, $R_3$, and n are the same as those in General Formula (A).

[Chemical Formula 4]

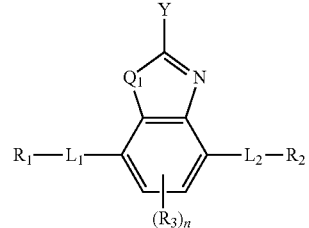

General Formula (2)

In General Formula (2), $Q_1$ represents —O—, —S—, —NRy- (where Ry represents a hydrogen atom or a substituent), —CRaRb- (where Ra and Rb each represent a hydrogen atom or a substituent), or —CO—. Here, Ry, Ra and Rb each represent a substituent, of which examples are the same as the specific examples of substituents represented by Wa and Wb described above.

Y represents a substituent. Examples of the substituent represented by Y are the same as the specific examples of substituents represented by above-mentioned Wa and Wb. Preferred for Y is an aryl group, a heterocyclic group, an alkenyl group or an alkynyl group.

Examples of the aryl group represented by Y include a phenyl group, a naphthyl group, an anthryl group, a phenanthryl group, a biphenyl group, etc., among which a phenyl group and a naphthyl group are preferred, and a phenyl group is more preferred.

Example of the heterocyclic group include heterocyclic groups having at least one heteroatom such as a nitrogen atom, an oxygen atom or a sulfur atom, that is, a furyl group, a pyrrolyl group, a thienyl group, a pyridinyl group, a thiazoryl group, a benzothiazolyl group, etc., preferred among these being a furyl group, a pyrrolyl group, a thienyl group, a pyridinyl group and a thiazoryl group.

These aryl groups and heterocyclic groups may have at least one substituent. Examples of such a substituent include halogen atoms, alkyl groups with carbon numbers of 1 to 6, a cyano group, an nitro group, alkylsulfinyl groups with carbon numbers of 1 to 6, alkylsulfonyl groups with carbon numbers of 1 to 6, carboxyl group, fluoroalkyl groups with carbon numbers of 1 to 6, alkoxy groups with carbon numbers of 1 to 6, alkylthio groups with carbon numbers of 1 to 6, N-alkylamino groups with carbon numbers of 1 to 6, N,N-dialkylamino groups with carbon numbers of 2 to 12, N-alkylsulfamoyl groups with carbon numbers of 1 to 6 and N,N-dialkylsulfamoyl groups with carbon numbers of 2 to 12.

$L_1$, $L_2$, $R_1$, $R_2$, $R_3$ and n are the same as those in General Formula (A).

(II) In a case where, in General Formula (A), at least one of Wa and Wb has a ring structure, specific examples are preferably expressed by General Formula (3) below.

[Chemical Formula 5]

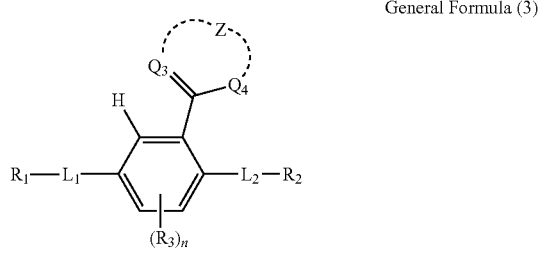

General Formula (3)

In General Formula (3), $Q_3$ represents =N— or =CRz- (where Rz represents a hydrogen atom or a substituent), and $Q_4$ represents a non-metallic atom of an element of group 14 to 16. Z represents a non-metallic atom group that forms a ring together with $Q_3$ and $Q_4$.

The ring formed by $Q_3$, $Q_4$, and Z may be further annelated with another ring. It is preferable that the ring formed by $Q_3$, $Q_4$, and Z be a nitrogen-containing five- or six-membered ring annelated with a benzene ring.

$L_1$, $L_2$, $R_1$, $R_2$, $R_3$ and n are the same as those in General Formula (A).

(III) In a case where at least one of Wa and Wb is an alkenyl group or an alkynyl group, it is preferable that they be vinyl group or ethynyl group having a substituent Among compounds expressed by General Formulas (1), (2) and (3) above, particularly preferred are those expressed by General Formula (3).

Compounds expressed by General Formula (3) excel those expressed by General Formula (1) in heat resistance and light resistance, and excel those expressed by General Formula (2) in solubility in organic solvents and compatibility with polymers.

It is preferable that the content of a compound expressed by General Formula (A) in the cellulose derivative be in the range of 1 to 15% by mass so as to provide desired wavelength dispersion and ooze resistance, and particularly preferably in the range of 2 to 10% by mass. Within these ranges, the cellulose derivative has satisfactory wavelength dispersion and ooze resistance.

Compounds expressed by General Formulas (A), (1), (2) and (3) can be obtained by well-known methods. Specifically, they can be synthesized by the methods described in Journal of Chemical Crystallography (1997); 27(9); 512-526), Japanese Patent Application Publication No. 2010-31223, Japanese Patent Application Publication No. 2008-107767, etc.

(Cellulose Acylate)

A cellulose acylate film according to the present embodiment contains cellulose acylate as a main component. For example, a cellulose acylate film according to the present embodiment contains, preferably, 60 to 100% by mass of cellulose acylate in the total mass (100% by mass) of the film. The total degree of substitution by acyl group in cellulose acylate is 2.0 or more but less than 3.0, and more preferably in the range of 2.2 to 2.7.

Examples of cellulose acylate include esters of cellulose and an aliphatic carboxylic acid and/or an aromatic carboxylic acid with a carbon number of about 2 to 22, particularly preferred being esters of cellulose and a low fatty acid with a carbon number of 6 or less.

An acyl group bonded to a hydroxyl group in cellulose may be straight-chained or branched, may form another ring, and may be substituted by another substituent. For a given degree of substitution, the greater the carbon number, the lower birefringence. Thus, it is preferable to select from acyl groups with carbon numbers of 2 to 6, and the sum of the degrees of substitution by propionyl group and butyryl group is 0 or more but 3.0 or less. It is preferable that, in the form of cellulose acylate, the carbon number be in the range of 2 to 4, and more preferably in the range of 2 to 3.

Specifically, as cellulose acylate, it is possible to use an ester of mixed fatty acids of cellulose, such as cellulose acetate propionate, cellulose acetate butyrate, cellulose acetate propionate butyrate or cellulose acetate phthalate, where not only an acetyl group but also a propionate group, a butyrate group or a phtharyl group is bonded. A butyryl group forming butyrate may be straight-chained or branched.

In the present embodiment, particularly preferably used as cellulose acylate is cellulose acetate, cellulose acetate butyrate or cellulose acetate propionate.

It is preferable that the cellulose acylate described above fulfill both formulas (i) and (ii) below.

$$2.0 \leq X+Y < 3.0 \quad \text{Formula (i):}$$

$$0 \leq X < 3.0 \quad \text{Formula (ii):}$$

In these formulas, Y represents the degree of substitution by acetyl group, and X represents the degree of substitution by propionyl group, butyryl group or a mixture thereof.

To obtain desired optical properties, resins with different degrees of substitution may be mixed. In that case, it is preferable that the mix ratio be 1:99 to 99:1 by mass (mass ratio).

Particularly preferred species of cellulose acylate among those mentioned above is cellulose acetate propionate. With cellulose acetate propionate, it is preferable that $0 \leq Y \leq 2.5$ and in addition that $0.5 \leq X < 3.0$ (where $2.0 \leq X+Y < 3.0$), and it is more preferable that $0.5 \leq Y \leq 2.0$ and in addition that $1.0 \leq X \leq 2.0$ (where $2.0 \leq X+Y < 3.0$). The degree of substitution by an acyl group can be measured in compliance with ASTM-D817-96, which is one of the standards formulated and promulgated by ASTM (American Society for Testing and Materials).

It is preferable that cellulose acylate have a number-average molecular weight in the range of 60000 to 300000, because the obtained film has high mechanical strength. It is more preferable to use cellulose acylate having a number-average molecular weight in the range of 70000 to 200000.

The weight-average molecular weight (Mw) and the number-average molecular weight (Mn) of cellulose acylate can be measured by gel permeation chromatography (GPC). The measurement conditions are as follows. This measurement method is applicable to other polymers in the present embodiment.

Solvent: methylene chloride;
Colum: Shodex K806, K805, and K803G (manufactured by Showa Denko K.K.), three columns connected together;
Column Temperature: 25° C.;
Sample Concentration: 0.1% by mass;
Detector: RI Model 504 (manufactured by GL Sciences Inc.);
Pump: L6000 (manufactured by Hitachi, Ltd.);
Flow Rate: 1.0 ml/min.;
Calibration Curve: Calibration curves for 13 samples of standard polystyrene STK standard polystyrene (manufactured by Tosoh Corporation) Mw=1000000 to 500 are used; with 13 samples used at approximately equal intervals.

It is preferable that the residual sulfuric acid content in cellulose acylate be in the range of 0.1 to 45 ppm by mass in terms of sulfur element. The content is considered to be in the form of salts. With a residual sulfuric acid content over 45 ppm by mass, breakage tends to be more likely during heat stretching and during slitting after heat stretching. It is more preferable that the residual sulfuric acid content be in the range of 1 to 30 ppm by mass. The residual sulfuric acid content can be measured by a method stipulated in ASTM-D817-96.

It is preferable that the free acid content in cellulose acylate be in the range of 1 to 500 ppm by mass. Within this range, as mentioned above, breakage is advantageously less likely. It is preferable that the free acid content in the range of 1 to 100 ppm by mass, because breakage is still less likely, and particularly preferably in the range of 1 to 70 ppm by mass. The free acid content can be measured by a method stipulated in ASTM-D817-96.

By cleaning the synthesized cellulose acylate more thoroughly than when used in solution flow casting, it is preferably possible to make the residual alkali earth metal content, the residual sulfuring acid content, and the residual acid content fall within the above-mentioned ranges.

It is preferable that the cellulose acylate, when formed into a film, have as few bright spot defects as possible. Bright spot defects mean spots (defects) at which, when two polarizing plates are placed in a crossed-nicols arrangement with an optical film or the like placed in between and light is shone from the side of one polarizer plate, light leaking from the opposite side is observed from the side of the other polarizer plate. For bright spot defects with diameters of 0.01 mm or more, it is preferable that the number of bright spots be 200/cm$^2$ or less, more preferably 100/cm$^2$ or less, still more preferably 50/cm$^2$ or less, even more preferably 30/cm$^2$ or less, particularly preferably 10/cm$^2$ or less and most preferably zero.

Also for bright spot defects with diameters of 0.005 to 0.01 mm or less, it is preferable that the number of bright spots be 200/cm$^2$ or less, more preferably 100/cm$^2$ or less, still more preferably 50/cm$^2$ or less, even more preferably 30/cm$^2$ or less, particularly preferably 10/cm$^2$ or less and most preferably zero.

There is no particular restriction on cellulose as a source material for cellulose acylate, examples including cotton linters, wood pulp, and kenaf. Cellulose acylate obtained therefrom can be mixed and used in arbitrary proportions.

Cellulose acylate can be manufactured by a well-known method. Specifically, it can be synthesized, for example, by the method described in Japanese Patent Application Publication No. H10-45804.

Cellulose acylate is also affected by trace-amount metal components in it. Such trace-amount metal components are considered to be related to water used in the manufacturing process, and it is preferable that a component that can be a kernel of insolubility be contained as little as possible. In particular, metal ions such as iron, calcium, and magnesium can produce insoluble products by forming salts with polymer decomposition products that may contain organic acid groups, and it is preferable that such components be contained as little as possible. A calcium (Ca) component easily forms coordination compounds (that is, complexes) with acid components such as carbonic acids and sulfonic acids and with many ligands, and may form scum (insoluble sediment, dregs) derived from many insoluble calcium compounds; it is thus preferable that the calcium component be contained as little as possible.

Specifically, for an iron (Fe) component, it is preferable that its content in cellulose acylate be 1 ppm or less by mass. For a calcium (Ca) component, it is preferable that its content in cellulose acylate be 60 ppm or less by mass, and more preferably 0 to 30 ppm by mass. Furthermore, for a magnesium (Mg) component, since its excessive content produces insoluble products, it is preferable that its content in cellulose acylate be 0 to 70 ppm by mass, and particularly preferably 0 to 20 ppm by mass.

The contents of metal components, such as the contents of the iron (Fe) component, the calcium (Ca) component, and the magnesium (Mg) component, can be analyzed by decomposing cellulose acylate in a bone-dried state with sulfuric nitric acid on a microdigest wet decomposer, then pre-processing it by alkali fusion, and then using an ICP-AES (inductively coupled plasma atomic emission spectrometer).

(Additives)

The long stretched film obtained by the manufacturing method according to the present embodiment may be one obtained by mixing, as necessary, a polymer component other than a cellulose ester to be described later. It is preferable that the polymer component to be mixed be compatible with a cellulose ester, and that, in the form of a film, it have a transmittance of 80% or more, more preferably 90% or more, and further preferably 92% or more.

Examples of additives that can be added to the dope include a plasticizer, an ultraviolet absorber, a retardation adjuster, an antioxidant, a deterioration inhibitor, a release assistant, a surface-active agent, a dye, and fine particles. In the present embodiment, an additive other than fine particles may be added during preparation of a cellulose ester solution or may be added during preparation of a fine particle-dispersed liquid. It is preferable to add a plasticizer, an antioxidant, an ultraviolet absorber, etc. to a polarizing plate used in a liquid crystal display device in order to provide heat resistance and moisture resistance.

It is preferable that the content of those compounds in a cellulose ester be 1 to 30% by mass, and more preferably 1 to 20% by mass. To suppress bleeding out etc. during stretching and drying, it is preferable that those compounds have a vapor pressure of 1400 Pa or less at 200° C.

Those compounds may be added along with a cellulose ester and a solvent during preparation of a cellulose ester solution or may be added during or after preparation of the solution.

(Retardation Adjuster)

As a compound that is added for adjustment of retardation, it is possible to use an aromatic compound having two or more aromatic rings as disclosed in European Patent No. 911,656 A2.

Two or more species of aromatic compounds may be used together. It is particularly preferable that the aromatic rings of such aromatic compounds include, in addition to an aromatic hydrocarbon ring, an aromatic hetero ring. In general, an aromatic hetero ring is an unsaturated hetero ring. Particularly preferred among them is 1,3,5-triazine ring.

(Polymer or Oligomer)

In the present embodiment, it is preferable that a cellulose ester film include a cellulose ester and a polymer or an oligomer of a vinyl compound having a substituent selected from the group of a carboxyl group, a hydroxyl group, an amino group, an amide group and a sulfonic acid group and having a weight-average molecular weight in the range of 500 to 200,000. It is preferable that the content ratio by mass of the cellulose ester to the polymer or the oligomer be in the range of 95:5 to 50:50.

(Matting Agent)

In the present embodiment, as a matting agent, fine particles can be contained in the stretched film. This makes the stretched film, in a case where it is a long film, easy to transport and wind up.

It is preferable that the matting agent be primary particles or secondary particles with a particle diameter of 10 nm to 0.1 μm. A preferred matting agent is approximately spherical primary particles with an ellipticity of 1.1 or less.

Preferred fine particles contain silicon, and particularly preferably silicon dioxide. Examples of the fine particles of silicon dioxide preferred in the present embodiment include those manufactured by Nippon Aerosil Co., Ltd. under the product names Aerosil R972, R972V, R974, R812, 200, 200V, 300, R202, OX50 and TT600 (which are manufactured by Nippon Aerosil Co., Ltd.). Preferred among these are Aerosil 200V, R972, R972V, R974, R202 and R812. Examples of polymer fine particles include particles of silicone resin, fluorine resin and acrylic resin. Preferred is silicone resin, in particular one having a three-dimensional net-like structure. Examples of such resins include Tospearl 103, Tospearl 105, Tospearl 108, Tospearl 120, Tospearl 145, Tospearl 3120 and Tospearl 240 (manufactured by Toshiba Silicone Co., Ltd.).

Preferred as the fine particles of silicon dioxide are those with a primary particle average diameter of 20 nm or less and an apparent specific gravity of 70 g/L or more. It is more preferable that the average primary particle diameter be 5 to 16 nm, further preferably 5 to 12 nm. Preferably, the smaller the average primary particle diameter, the lower the haze. It is preferable that the apparent specific gravity be 90 to 200 g/L or more, and more preferably 100 to 200 g/L or more. Preferably, the greater the apparent specific gravity, the easier it is to prepare a fine particle-dispersed liquid at a high concentration, and the less likely haze or agglomeration is generated.

In the present embodiment, a preferred amount of matting agent added is, per square meter of the long stretched film, 0.01 to 1.0 g, more preferably 0.03 to 0.3 g and further preferably 0.08 to 0.16 g.

(Other Additives)

Inorganic fine particles, such as kaolin, talc, diatomaceous earth, quartz, calcium carbonate, barium sulfate, titanium oxide or alumina, and a heat stabilizer, such as a salt of an alkaline-earth metal such as calcium or magnesium may be added. Furthermore, a surface-active agent, a release assistant, an antistat, a flame-retardant, a lubricant, an oily agent, etc may be added.

(Tension Softening Point)

In the present embodiment, a cellulose ester resin film is expected to withstand use in higher-temperature environments. Accordingly, the cellulose ester resin film has a tension softening point of, preferably, 105° C. to 145° C., because it has satisfactory heat resistance, and more preferably 110° C. to 130° C.

In one specific method of measuring the tension softening point, for example, a Tensilon tester (model RTC-1225A manufactured by Orientec Co., Ltd.) is used: a piece sized 120 mm (long)×10 mm (wide) is cut out of a sample film; while the piece is held under a tension of 10 N, temperature is raised at a speed of 30° C./min; when the tension becomes 9 N and temperature is measured three times, with the result that it is possible to determine the tension softening point with the average.

(Rate of Dimensional Change)

In a case where a cellulose ester resin film in the present embodiment is used in an organic EL image display device, to prevent a dimensional change due to moisture absorption from causing a problem such as uneven thickness, variation in retardation value, diminished contrast or uneven color, it is preferable that the cellulose ester resin film have a dimensional change rate (%) less than 0.5%, and more preferably less than 0.3%.

(Defects)

It is preferable that a cellulose ester resin film in the present embodiment have as few defects in the film as possible. Here, defects refer to voids (bubble defects) in the film which result from rapid vaporization of a solvent in a drying step during solution film formation, and to foreign matter (foreign matter defects) in the film that is present in the solution for film formation or that is mixed into the film during the film formation.

Specifically, it is preferable that the number of defects with a diameter of 5 μm or more in the plane of the film be 1 or less/10 centimeters square, more preferably 0.5 or less/10 centimeters square, and still more preferably 0.1 or less/10 centimeters square.

When the defect is circular, the diameter of the defect is the diameter thereof. When the defect is not circular, the area of the defect is determined by the method described below through observation under a microscope, and the maximum diameter of the area (the diameter of the circumcircle) is taken as the diameter of the defect.

When the defect is a bubble or foreign matter, the area of the defect is the size of the shadow of the defect when it is observed under a differential interference microscope with transmitted light. When the defect is a change in the surface shape, such as a transferred scratch on a roll or a scratch, the size of the defect is determined through observation under a differential interference microscope with reflected light.

In observation with reflected light, if the size of the defect is unclear, observation is performed with aluminum or platinum deposited on the surface. For high-productivity production of a film with high quality as expressed by such a frequency of defects, it is effective to subject the polymer solution to high-precision filtering immediately before flow casting, to improve the cleanness around flow casting equipment and to set the conditions for drying after flow casting stepwise such that drying is performed efficiently but with suppressed bubble development.

If the number of defects is more than 1/10 centimeters square, when the film is exposed to tension, for example, during working in post-processing, the film may break with a defect acting as the starting point, leading to diminished productivity. If the defect has a diameter of 5 μm or more, it can be visually recognizable through observation using a polarizing plate, and may form a bright spot when the film is used as the optical member.

(Breaking Elongation)

The cellulose ester resin film according to the present embodiment has a breaking elongation of preferably 10% or more, and more preferably 20% or more, in at least one direction as measured in compliance with JIS-K7127-1999, which is one of the standards formulated by JIS (Japanese Industrial Standards Committee).

There is no particular restriction on the upper limit of breaking elongation; in practical terms, however, it is about 250%. For higher breaking elongation, it is effective to suppress defects in the film resulting from foreign matter or bubble formation.

(Full-Spectrum Transmittance)

The cellulose ester resin film according to the present embodiment has a full-spectrum transmittance of preferably 90% or more, and more preferably 93% or more. A practical upper limit of full-spectrum transmittance is about 99%. To obtain excellent transparency as expressed by such full-spectrum transmittance, it is effective to avoid introducing an additive or a copolymer component that absorbs visible light, and to eliminate foreign matter in the polymer by high-precision filtering so as to reduce diffusion and absorption of light inside the film. It is also effective to reduce the surface roughness of portions that make contact with the film during the film formation (such as a cooling roll, a calendar roll, a drum, a belt, an application base material in solution film formation and a transport roll) so as to reduce the surface roughness of the film surface.

<Film Formation of the Long Film>

The long film according to the present embodiment, formed of the resin described above, can be manufactured by solution flow casting or melt flow casting as described below. These film formation methods will be described below. Although the following description deals with a case where, as the long film, a cellulose ester resin film is formed, it applies equally to film formation of any other resin film.

[Solution Flow Casting]

From the viewpoints of suppressing film coloring, suppressing foreign-matter defects, suppressing optical defects such as dye lines, excellent film flatness and transparency and the like, it is preferable to manufacture the long film by solution flow casting.

(Organic Solvent)

As an organic solvent useful in forming a dope in a case where the cellulose ester resin film according to the present embodiment is manufactured by solution flow casting, any solvent can be used with no restriction so long as both cellulose acetate and other additives dissolve in it.

An example of a chlorinated organic solvent is methylene chloride. Examples of a non-chlorinated organic solvent include methyl acetate, ethyl acetate, amyl acetate, acetone, tetrahydrofurane, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol and nitroethane. Preferred among these are methylene chloride, methyl acetate, ethyl acetate and acetone.

It is preferable that the dope contain, in addition to the above-mentioned organic solvent, 1 to 40% by mass of a straight-chained or branched aliphatic alcohol with a carbon number of 1 to 4. A high content of the alcohol in the dope causes gelation of the web, allowing easy release from a metal support member; on the other hand, a low content of the alcohol promotes dissolution of cellulose acetate in a non-chlorinated organic solvent.

Particularly preferred is a dope composition prepared by dissolving at least a total of 15 to 45% by mass of three materials, namely acrylic resin, cellulose ester resin and acrylic particles, in a solvent containing methylene chloride and a straight-chained or branched aliphatic alcohol with a carbon number of 1 to 4.

Examples of the straight-chained or branched aliphatic alcohol with a carbon number of 1 to 4 include methanol, ethanol, n-propanol, iso-propanol, n-butanol, sec-butanol and tert-butanol. Preferred among these for dope stability, a comparative low boiling point and fast drying is ethanol.

(Solution Flow Casting)

The cellulose ester resin film according to the present embodiment can be manufactured by solution flow casting. Solution flow casting involves a step of preparing a dope by dissolving resin and additives in a solvent, a step of flow-casting the dope on a metal support member in the shape of a belt or a drum, a step of drying the flow-cast dope in the form of a web, a step of releasing from the metal support member, a step of stretching or width keeping, a step of further drying and a step of winding up the finished film.

Preferably, the higher the concentration of cellulose acetate in the dope, the lower the drying load after flow casting on the metal support member. An excessive concentration, however, leads to an increased load in filtering, inviting lower filtering precision. To achieve both simultaneously, the concentration is preferably 10 to 35% by mass, and further preferably 15 to 25% by mass. Preferably used as the metal support member for flow casting is one having a mirror-finished surface, and preferably used as the metal support member is a stainless steel belt or a cast drum having its surface finished by plating.

The surface temperature of the metal support member in the flow casting step is set at −50° C. or higher but below a temperature at which the solvent boils and forms bubbles. Preferably, the higher the temperature of the support member, the faster the web dries, but an excessively high temperature may cause bubble formation in the web or degraded flatness.

A preferred temperature of the support member is determined as necessary in the range of 0 to 100° C., and more preferably in the range of 5 to 30° C. Another preferred method is to cool the web to gelate it so that it is released from the drum in a state containing a large proportion of residual solvent. There is no particular restriction on the method of controlling the temperature of the metal support member; it is possible to adopt a method involving blowing heated or cooled wind, or to bring heated water in contact with, the underside of the metal support member. Using heated water is preferred, because it allows efficient transfer of heat and takes less time until the temperature of the metal support member becomes constant.

In a case where heated wind is used, with consideration given to a drop in the temperature of the web ascribable to latent heat of vaporization of the solvent, wind heated to over the boiling point of the solvent can be used such that, while wind at a temperature higher than the target temperature is used, bubble formation is prevented.

It is particularly preferable to perform drying efficiently by varying the temperature of the support member and the temperature of the drying wind between flow casting and releasing.

For a cellulose ester resin film to exhibit satisfactory flatness, it is preferable that the amount of residual solvent at the time that the web is released from the metal support member be in the range of 10 to 150% by mass, further preferably 20 to 40% by mass or 60 to 130% by mass, and particularly preferably 20 to 30% by mass or 70 to 120% by mass. Here, the amount of residual solvent is defined by the following formula.

Amount of Residual Solvent (% by mass)=[(*M*−*N*)/ *N*]×100

Here, M represents the mass (g) of the sample collected at an arbitrary time point during or after the manufacturing of the web or the film, and N represents the mass (g) after heating of M at 115° C. for one hour.

In the step of drying the cellulose ester resin film, it is preferable to release the web from the metal support member and further dry it such that the amount of residual solvent is 1% or less by mass, further preferably 0.1% or less by mass and particularly preferably 0 to 0.01% or less by mass.

Generally adopted in the step of drying the film is a method where the web is dried while being transported, such as a roll drying method (where the web is dried by being alternately passed between a large number of rolls arranged under and over it) or a tenter method.

[Melt Flow Casting]

Melt flow casting is preferred from the viewpoint of ease of reducing retardation Rt in the thickness direction of the film after oblique stretching, which will be described later, and from other view points such as a reduced amount of residual volatile components and excellent dimensional stability. Melt flow casting involves heating and melting a composition containing resin and additives such as a plasticizer up to a temperature at which it exhibits fluidity, and then flow-casting the melt containing fluid cellulose acetate to form a film. Methods involving the formation by melt flow casting can be classified into melt extrusion (molding), press molding, inflation, injection molding, blow molding, draw molding, etc. Among these, melt extrusion is preferred because it produces a film with excellent mechanical strength, surface accuracy, etc. In general, it is preferable that a plurality of source materials used in melt extrusion be previously blended and kneaded and pelletized.

Pelletizing may be performed by a well-known method. For example, dry cellulose acetate, plasticizer and other additives are fed by a feeder into an extruder; then, on a single-axis or two-axis extruder, the mixture is blended and kneaded and is extruded from a die in the form of a strand, which is then cooled with water or air, and is then cut into pellets.

The additives may be mixed before being fed into the extruder or may be fed by separate feeders. For even mixing, it is preferable that additives added in small amounts, such as particles and antioxidant, be mixed beforehand.

It is preferable that the extruder be operated with a suppressed shearing force, and that, to prevent deterioration of resin (reduced molecular weight, coloring, gel formation or the like), working proceed in a pelletizable fashion and at as low a temperature as possible. For example, on a two-axis extruder, it is preferable to rotate them in the same direction by use of deep-groove screws. For even blending and kneading, a meshed-together type is preferred.

By use of the pellets obtained as described above, film formation is performed. Needless to say, unpelletized source materials in powder form as they are can be fed by a feeder into an extruder to perform film formation.

On a single-axis or two-axis extruder, the pellets described above are subjected to extrusion at a melt temperature of about 200 to 300° C.; the melt is then subjected to filtering with a leaf-disc filter or the like to remove foreign matter, is then flow-cast into a film from a T-die; the film is then nipped between a cooling roll and an elastic touch roll so as to set on the cooling roll.

It is preferable that the feeding of the pellets from the feed hopper into the extruder be performed under vacuum, under reduced pressure or under an environment of an inert gas to prevent decomposition due to oxidation or the like.

It is preferable that extrusion be performed at a stable flow rate with a gear pump or the like introduced. Preferably used as a filter for foreign matter removal is a stainless fiber sintered filter. The stainless fiber sintered filter is formed by compressing a complex tangle of stainless fibers and then sintering the contact spots to form a single piece. It is possible to vary its density by varying the fiber thickness and the degree of compression and thereby adjust filtering precision.

Additives such as plasticizer and particles may be previously mixed with resin or may be kneaded in in the middle of the extruder. For even addition, it is preferable to use a mixing device such as a static mixer.

When the film is nipped between the cooling roll and the elastic touch roll, it is preferable that the touch roll-side temperature of the film be equal to or higher than the film's Tg (glass transition temperature) but equal to or lower than Tg+110° C. As a roll having a surface of an elastic member for use for such a purpose, a well-known roll can be used.

An elastic touch roll is also referred to as a nip rotary member. As the elastic touch roll, a commercially available one can also be used.

When the film is released from the cooling roll, it is preferable to control the tension so as to prevent deformation of the film.

A long film manufactured by any of the film formation methods described above may be a single-layer film or a stacked film having two or more layers. A stacked film can be obtained by a well-known method such as co-extrusion molding, co-flow casting, film lamination or application. Of these, co-extrusion molding and co-flow casting are preferred.

<Specification of the Long Film>

The long film according to the present embodiment has a thickness of preferably 30 to 200 μm, and more preferably 40 to 150 μm. In the present embodiment, the thickness unevenness σm in the flow direction (transport direction) of the long film fed to the stretching zone, which will be described later, needs to be less than 0.30 μm, preferably less than 0.25 μm, and further preferably less than 0.20 μm from the viewpoint of keeping constant the drawing tension of the film at the entrance of the oblique stretching tenter, which will be descried later, and from the viewpoint of stabilizing optical properties such as orientation angle and retardation. If the thickness unevenness σm in the flow direction of the long film is 0.30 µm or more, variation in optical properties such as orientation angle and retardation degrades notably.

As the long film, a film having a thickness gradient in the width direction may be fed. The thickness gradient of the long film can be found empirically by stretching a film whose thickness gradient is varied experimentally such that the film thickness at the position where stretching in post-processing is completed is most even. The thickness gradient of the long film can be adjusted, for example, such that the thickness at the end with the larger thickness is about 0.5 to 3% more than at the end with the smaller thickness.

The width of the long film is subject to no particular restriction, and can be in the range of 500 to 4000 mm, and preferably in the range of 1000 to 2000 mm.

A preferred modulus of elasticity at the stretching temperature during oblique stretching of the long film, as expressed in terms of Young's modulus, is equal to or more than 0.01 MPa but equal to or less than 5000 MPa, and further preferably equal to or more than 0.1 MPa but equal to or less than 500 MPa. If the modulus of elasticity is too low, the shrinkage ratio during and after stretching is so low that creases are hard to remove. If the modulus of elasticity is too high, the tension applied during stretching is so high that increased mechanical strength is required in the parts that hold both side edge portions of the film, increasing the load on the tenter in post-processing.

As the long film, a non-oriented film may be used or a pre-oriented film may be fed. If necessary, the long film may be oriented in an arcuate, that is, so-called bow-shaped, distribution in the width direction. In short, the orientation state of the long film can be adjusted such that a desired film orientation is obtained at the position where stretching in post-processing is completed.

<System for Manufacturing the Obliquely Stretched Long Film>

Then, before description of a device for manufacturing an obliquely stretched long film, whereby the long film described above is stretched in an oblique direction with respect to the width direction, the entire system for manufacturing an obliquely stretched long film including such a manufacturing device will be described.

(Outline of the System)

Figure 2:
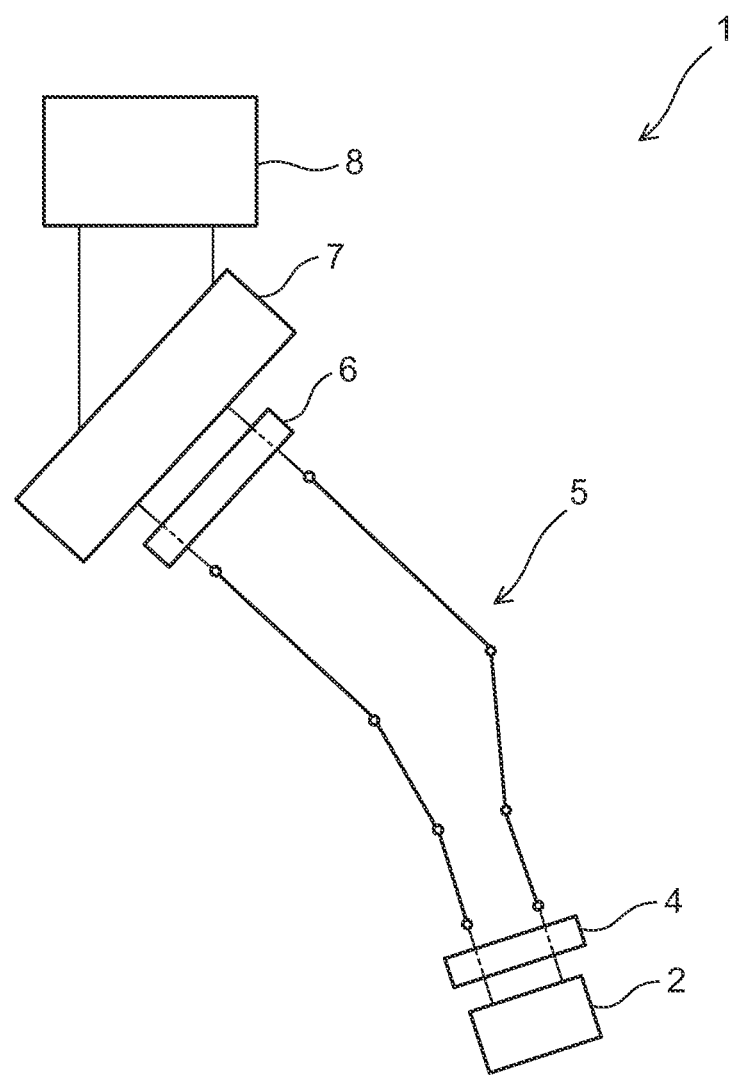
FIG. 2 A plan view schematically showing another configuration of the manufacturing system.
Figure 3:
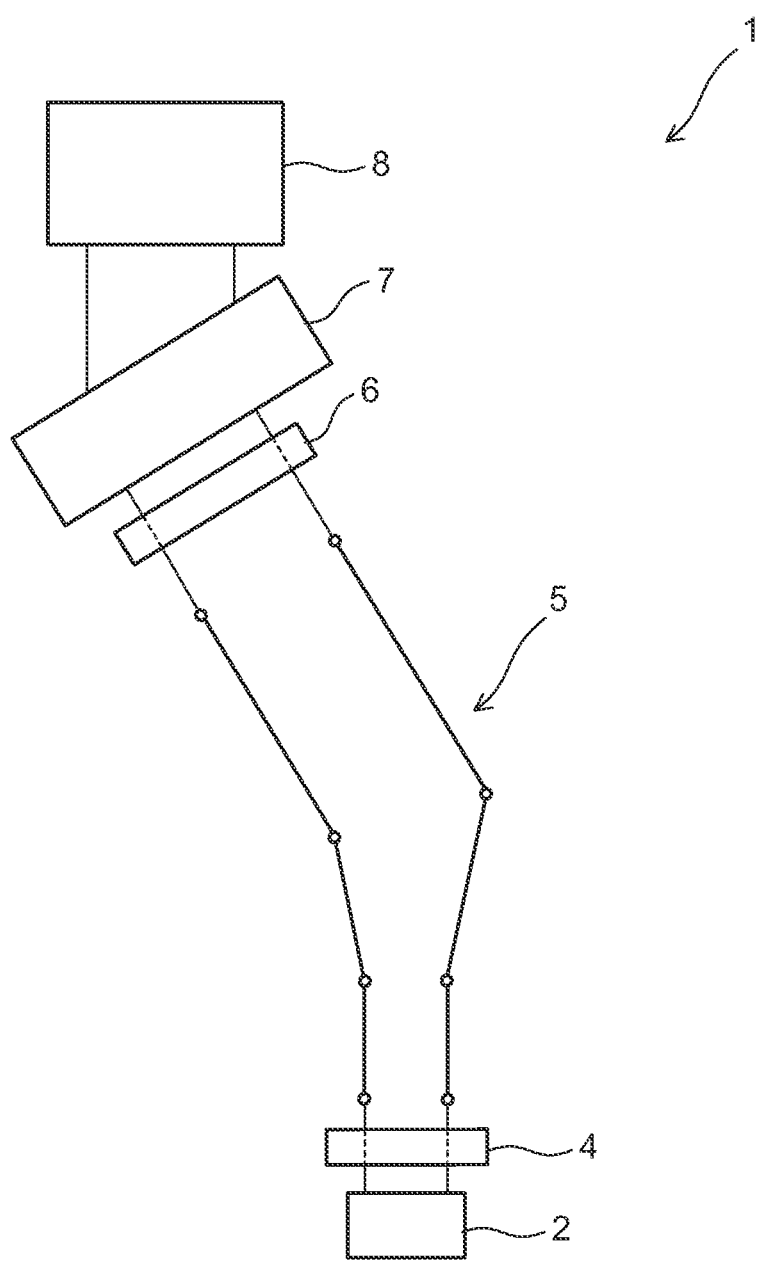
FIG. 3 A plan view schematically showing yet another configuration of the manufacturing system.

FIG. 1 is a plan view schematically showing an outline configuration of a stretched film manufacturing system 1. FIG. 2 is a plan view schematically showing another configuration of the manufacturing system 1, and FIG. 3 is a plan view schematically showing yet another configuration of the manufacturing system 1. As shown in FIG. 1, the manufacturing system 1 according to the present embodiment is provided with, from the upstream side in the transport direction of the long film, a film dispensing portion 2, a transport direction changing portion 3, a guide roll 4, a stretching portion 5, a guide roll 6, a transport direction changing portion 7 and a film winding portion 8. The stretching portion 5, which is a device for manufacturing a stretched film in the present embodiment, will be described in detail later.

The film dispensing portion 2 dispenses the above-described long film as a target of stretching to the stretching portion 5. The film dispensing portion 2 may be configured as a separate unit from or may be configured integrally with, the long film formation device. In the former case, the long film after film formation is first wound around a core into a roll (a full-width long film roll), which is then loaded on the film dispensing portion 2, so that the long film is dispensed from the film dispensing portion 2. On the other hand, in the latter case, the film dispensing portion 2 feeds the long film after film formation, without winding it up, to the stretching portion 5.

The transport direction changing portion 3 changes the transport direction of the long film dispensed from the film dispensing portion 2 to a direction toward the entrance of the stretching portion 5 as an oblique stretching tenter. The transport direction changing portion 3 is configured to include, for example, a turn bar which changes the transport direction by turning over the film while transporting it, and a rotary table which permits the turn bar to turn in a plane parallel to the film.

By changing the transport direction of the long film in the transport direction changing portion 3 as described above, it is possible to reduce the width of the manufacturing system 1 as a whole, and also to finely control the film dispensing position and angle, making it possible to produce a long stretched film with little variation in film thickness and optical values. By configuring the film dispensing portion 2 and the transport direction changing portion 3 to be movable (slidable, rotatable), it is possible to effectively prevent improper clamping of the film by left and right clips (holding members) which hold the film at both end portions in the width direction of the long film in the stretching portion 5.

The film dispensing portion 2 may be configured to be slidable and rotatable such that it can dispense the long film at a predetermined angle with respect to the entrance of the stretching portion 5. In that case, as shown in FIGS. 2 and 3, the provision of the transport direction changing portion 3 can be omitted.

At least one guide roll 4 is provided on the upstream side with respect to the stretching portion 5 to stabilize the path of the long film in motion. The guide roll 4 may be composed of a pair of upper and lower rolls sandwiching the film or may be composed of a plurality of pairs of rolls. The guide roll 4 closest to the entrance of the stretching portion 5 is a follower roll which guides the motion of the film, and is rotatably pivoted on unillustrated bearings. As the material for the guide roll 4, any well-known material can be used. To prevent the film from being scratched, it is preferable to apply a ceramic coating on the surface of the guide roll 4 or to reduce the weight of the guide roll 4 as by using a light metal such as aluminum plated with chromium.

It is preferable that one of the rolls provided on the upstream side with respect to the guide roll 4 closest to the entrance of the stretching portion 5 be brought in pressed contact with a rubber roller to form a nip. Such a nip roll helps suppress variation in the dispensing tension in the film flow direction.

At the pair of bearings at both (left and right) ends of the guide roll 4 closest to the entrance of the stretching portion 5, there are provided a first and a second tension detection device as film tension detection devices for detecting the tension occurring in the film at that roll. As the film tension detection devices, for example, load cells can be used. As the load cells, well-known ones of a tension type or a compression type can be used. A load cell is a device that detects a load acting on a point of application by converting it into an electrical signal with a strain gauge fitted to a strain producing member.

Provided at the left and right bearings of the guide roll 4 closest to the entrance of the stretching portion 5, the load cells detect, at the left and right sides independently, the force that the film in motion acts on the roll, that is, the tension occurring near both side edges of the film in the film movement direction. The strain gauges are fitted directly to the support member constituting the bearings of the roll with the result that based on the strain occurring in the support member, the load, that is, the film tension, may be detected. It is assumed that the relationship between the occurring strain and the film tension is previously measured and known.

When the position and the transport direction of the film fed from the film dispensing portion 2 or the transport direction changing portion 3 to the stretching portion 5 is deviated from the position and the transport direction toward the entrance of the stretching portion 5, in proportion to the amount of the deviation, a difference arises in the tension near both side edges of the film at the guide roll 4 closest to the entrance of the stretching portion 5. Thus, by detecting this difference in tension by the provision of the film tension detecting devices described above, it is possible to discriminate the degree of the deviation. That is, if the transport position and the transport direction of the film are proper (if they are the position and direction toward the entrance of the stretching portion 5), the load that acts on the guide roll 4 is roughly even at both ends in the axial direction; if they are not proper, a difference arises in the film tension between the left and right sides.

Thus, by adjusting the position and transport direction (the angle relative to the entrance of the stretching portion 5) of the film, for example, by means of the transport direction changing portion 3 described above such that the difference in the tension of the film is equal between the left and right sides at the guide roll 4 closest to the entrance of the stretching portion 5, it is possible to stabilize the holding of the film with the holding members at the entrance of the stretching portion 5, and to reduce the incidence of troubles such as unexpected release from the holding members. It is further possible to stabilize the physical properties in the width direction of the film after oblique stretching by the stretching portion 5.

At least one guide roll 6 is provided on the downstream side of the stretching portion 5 to stabilize the path of the film (obliquely stretched long film) in motion after oblique stretching by the stretching portion 5.

The transport direction changing portion 7 changes the transport direction of the film after stretching transported from the stretching portion 5 to a direction toward the film winding portion 8.

Here, to allow for fine adjustment of the orientation angle (the direction of the in-plane slow axis of the film) and product variation, it is necessary to adjust the angle between the film transport direction at the entrance of the stretching portion 5 and the film transport direction at the exit of the stretching portion 5. For this angle adjustment, it is necessary to change, by the transport direction changing portion 3, the transport direction of the film after film formation so as to direct the film to the entrance of the stretching portion 5, and/or to change, by the transport direction changing portion 7, the transport direction of the film having left the exit of the stretching portion 5 so as to direct the film back in the direction of the film winding portion 8.

It is preferable to perform film formation and oblique stretching continuously from the viewpoints of productivity and yield. In a case where the film formation step, the oblique stretching step and the winding step are performed continuously, the transport direction of the film is changed by the transport direction changing portion 3 and/or the transport direction changing portion 7 such that the film movement direction is aligned in the film formation step and the winding step. That is, as shown in FIGS. 1 and 3, the transport direction (dispensing direction) of the film dispensed from the film dispensing portion 2 and the transport direction (winding direction) of the film immediately before being wound up in the film winding portion 8 are aligned with each other, and this helps reduce the width of the device as a whole with respect to the film movement direction.

Incidentally, the film movement direction does not necessarily have to be aligned between the film formation step and the winding step. However, to obtain a layout where the film dispensing portion 2 and the film winding portion 8 do not interfere with each other, it is preferable to change the movement direction of the film by the transport direction changing portion 3 and/or the transport direction changing portion 7.

The transport direction changing portions 3 and 7 described above can be implemented by a well-known method, such as by use of an air flow roll or an air turn bar.

The film winding portion 8 winds up the film transported from the stretching portion 5 via the transport direction changing portion 7, and is composed of a winder device, an accumulation device, a drive device or the like. The film winding portion 8 is preferably so configured as to be slidable in the lateral direction to allow adjustment of the film winding position.

The film winding portion 8 is configured to allow fine control of the film drawing position and angle to permit the film so as to be drawn at a predetermined angle relative to the exit of the stretching portion 5. This makes it possible to obtain a long stretched film with little variation in film thickness and optical values. It is also possible to effectively prevent development of creases in the film, and to improve film windability, permitting a long film to be wound up. In the present embodiment, the drawing tension T (N/m) of the film after stretching is preferably adjusted to fall within a range of 100 N/m<T<300 N/m, and is more preferably adjusted to fall within a range of 150 N/m<T<250 N/m.

When the drawing tension is equal to or less than 100 N/m, slack and creases in the film are easily produced, with the result that retardation and the profile of the orientation angle in the width direction of the film are also degraded. On the other hand, when the drawing tension is equal to or more than 300 N/m, variations in the orientation angle in the width direction of the film are degraded, with the result that the yield in the width (the efficiency of the taking in the width direction) is degraded.

In the present embodiment, the variations in the drawing tension T are preferably controlled to be within ±5% and are more preferably controlled to be within ±3%. When the variations in the drawing tension T are not within ±5%, variations in the optical properties in the width direction and the flow direction (transport direction) are increased. As the method of controlling the variations in the drawing tension T within the range described above, there is a method of measuring a load placed on the first roll (the guide roll 6) on the exit side of the stretching portion 5, that is, the tension of the film, and of controlling the rotation speed of a drawing roll (the winding roll of the film winding portion 8) with a general PID control method such that its value is constant. As the method of measuring the load, there is a method of attaching the load cell to the bearings of the guide roll 6 and of measuring the load placed on the guide roll 6, that is, the tension of the film. As the load cell, a known one such as a tension type or a compression type can be used.

The film after stretching is released from the holding with the holding members of the stretching portion 5, and is then discharged from the exit of the stretching portion 5. The both ends (at both sides) of the film, which have been held with the holding members, are then trimmed off, and the film is then sequentially wound around a core (winding roll) into a roll of the long stretched film. The trimming can be performed as necessary.

Before the long stretched film is wound up, to prevent blocking of the film with itself, the long stretched film may be overlaid on a masking film so that the two are wound up together or the winding may be performed while tape or the like is applied to at least one end (preferably, both ends) of the long stretched film which overlaps itself as the film is wound up. There is no particular restriction on the masking film so long as it can protect the long stretched film, examples including a polyethylene terephthalate film, a polyethylene film, and a polypropylene film.

(Details of the Stretching Portion)

Figure 4:
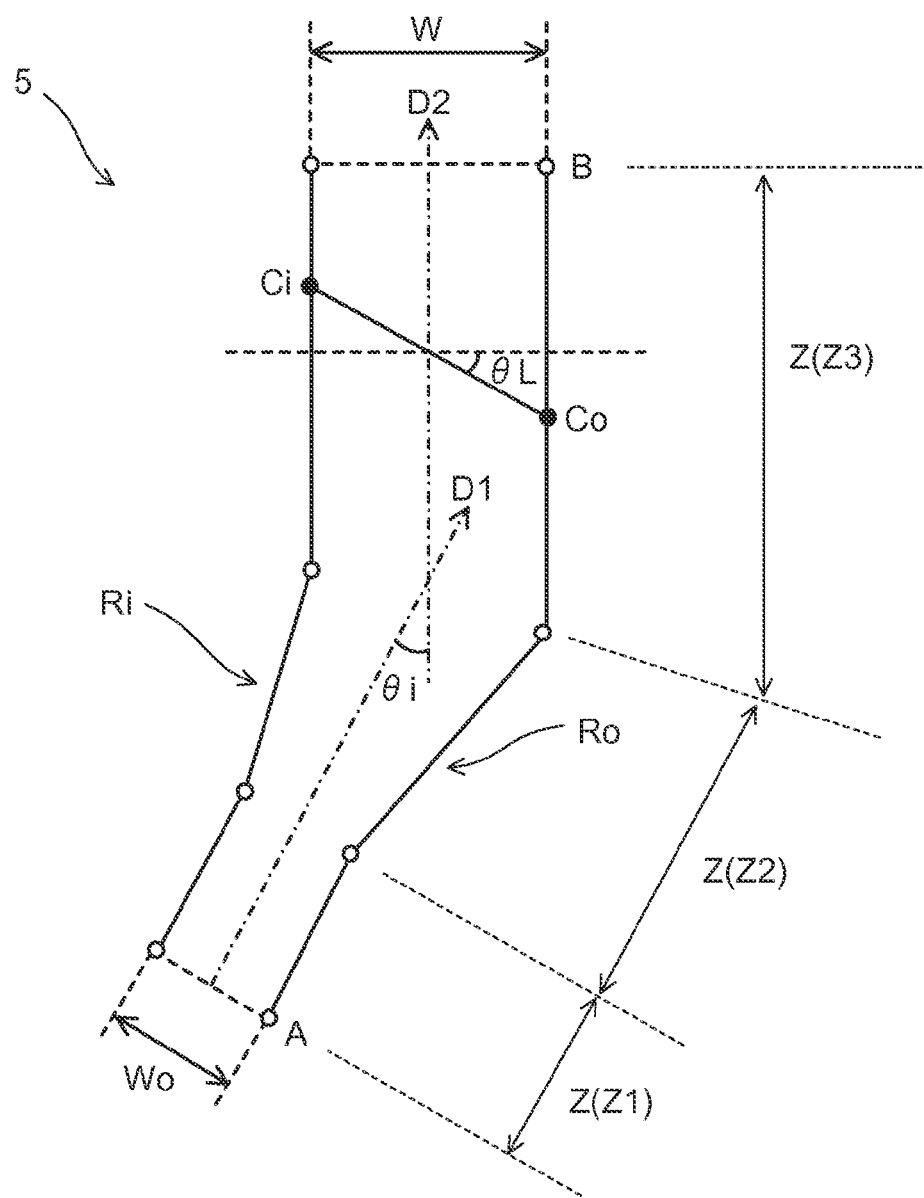
FIG. 4 A plan view schematically showing an example of a rail pattern of a stretching portion of the manufacturing system.

Then, the stretching portion 5 mentioned above will be described in detail. FIG. 4 is a plan view schematically showing an example of a rail pattern of the stretching portion 5. This is merely one example, and is not meant to limit the present invention in any way.

The manufacturing of the long stretched film according to the present embodiment is performed by use of, as the stretching portion 5, a tenter (an oblique stretcher) capable of oblique stretching. The tenter is a device that heats the long film to an arbitrary temperature at which it can be stretched and that stretches it obliquely. The tenter is provided with a heating zone Z, a pair of left-hand and right-hand rails Ri and Ro, and a number of holding members Ci and Co which move along the rails Ri and Ro to transport the film (in FIG. 4, only one pair of holding members is illustrated). The heating zone Z will be described in detail later. The rails Ri and Ro are each composed of a plurality of rail segments coupled together by couplers (in FIG. 4, white circles represent an example of the couplers). The holding members Ci and Co are composed of clips that hold both ends of the film in the width direction.

In FIG. 4, the dispensing direction D1 of the long film differs from the winding direction D2 of the long stretched film after stretching, and has a dispensing angle θi relative to the winding direction D2. The dispensing angle θi can be set at an arbitrary angle in the range of more than 0° but less than 90°.

With the dispensing direction D1 and the winding direction D2 different as described above, the tenter has a rail pattern that is non-symmetrical left to right. The rail pattern can be adjusted manually or automatically according to the orientation angle θ, the stretching factor, etc. to be given to the long stretched film to be manufactured. In the oblique stretcher used in a manufacturing method according to the present embodiment, preferably, the positions of each of the rail segments and rail couplers constituting the rails Ri and Ro can be set freely so that the rail pattern can be changed freely.

In the present embodiment, the holding members Ci and Co of the tenter are so configured as to move at constant speed while keeping constant intervals from those running ahead of and behind themselves. The movement speed of the holding members Ci and Co can be selected as necessary, and is generally in the range of 1 to 150 m/minute, and preferably 15 to 150 m/minute. The difference in movement speed between the pair of left-hand and right-hand holding members Ci and Co is generally 1% or less, preferably 0.5% or less, and more preferably 0.1% or less. This is because, if there is a difference in movement speed between the left and right sides at the exit of the stretching step, creaks develop and siding occurs at the exit of the stretching step, and therefore the speed of the left and right holding members needs to be substantially equal. In common tenter devices and the like, speed variation of the order of a second or less occurs according to the cycle of the cogs of a sprocket for driving a chain, the frequency of the driving motor, etc., and this often produces variation of several %. This, however, does not correspond to what is referred to as a difference in the speed in the present embodiment of the present invention.

In the oblique stretcher used in the manufacturing method according to the present embodiment, in particular at a location where the film is transported obliquely, the rails, which restrict the loci of the holding members, are often required to have a large curvature. With a view to preventing interference of holding members with one another due to a sharp bend and preventing local concentration of stress, it is preferable that, in the bent portion, the loci of the holding members describe curves.

As described above, it is preferable that an oblique stretching tenter used to give a long film an oblique orientation be one that can set the orientation angle of the film freely by varying the rail pattern in various ways, that can orient the orientation axis (slow axis) of the film evenly between the left and right sides over the film width direction with high accuracy and that in addition can control film thickness and retardation with high accuracy.

Then, stretching operation in the stretching portion 5 will be described. The long film is held at both ends thereof by the left and right holding members Ci and Co, and is transported through the heating zone Z as the holding members Ci and Co move. The left and right holding members Ci and Co are located in the entrance portion of the stretching portion 5 (at position A in the drawing), opposite each other in a direction substantially perpendicular to the film movement direction (dispensing direction D1); move on the rails Ri and Ro respectively, which are non-symmetrical left to right; and release the film, which they have been holding, in an exit portion (position B in the drawing) where stretching ends. The film released from the holding members Ci and Co is wound up around a core in the above-described film winding portion 8. The paired rails Ri and Ro each have an endless continuous track, and thus the holding members Ci and Co having released the film in the exit portion of the tenter then move along outer rails and return to the entrance portion sequentially.

Here, since the rails Ri and Ro are non-symmetrical left to right, in the example shown in FIG. 4, as the left and right holding members Ci and Co, which are located opposite each other at position A in the drawing, move along the rails Ri and Ro, the holding member Ci moving along the rail Ri (in-course) comes to run ahead of the holding member Co moving along the rail Ro (out-course).

Specifically, of the holding members Ci and Co, which are located opposite each other in a direction substantially perpendicular to the dispensing film direction D1 at position A in the drawing, when one holding member Ci reaches position B where stretching ends, the straight line through the holding members Ci and Co is inclined at angle θL relative to a direction substantially perpendicular to the film winding direction D2. With this behavior, the long film is stretched obliquely at an angle of θL relative to the width direction. Here, the "substantially perpendicular" refers to being at an angle in the range of 90±1°.

Then, the heating zone Z mentioned above will be described in detail. The heating zone Z of the stretching portion 5 is composed of a plurality of zones that are arranged along the transport direction of the film (the long film or the stretched film) and that perform temperature control for heating or cooling the film; in the present embodiment, the heating zone Z includes a preheating zone Z1 (preheating portion), a stretching zone Z2 (oblique stretching portion) and a heat-fixing zone Z3 (heat-fixing portion). Two adjacent zones are partitioned by partition plates 5a and 5b (see FIG. 6).

Figure 6:
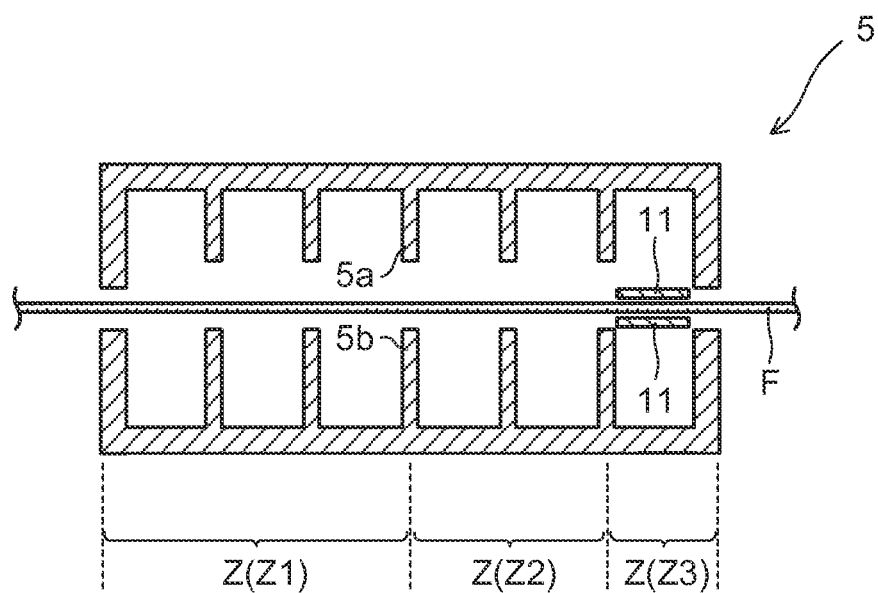
FIG. 6 A cross-sectional view of the stretching portion taken along a transport direction of the film.

Although in FIG. 6, the partition plates 5a and 5b are also provided within the preheating zone Z1 and the stretching zone Z2, and thus the same zones are further finely partitioned, at least two adjacent zones (the preheating zone Z1 and the stretching zone Z2, the stretching zone Z2 and the heat-fixing zone Z3) may be partitioned. The partition plates 5a and 5b are provided to be aligned vertically through a predetermined distance. In this way, in the stretching portion 5, the film held by the holding members Ci and Co are transported between the partition plates 5a and 5b, and are sequentially passed through the preheating zone Z1, the stretching zone Z2 and the heat-fixing zone Z3.

In the present embodiment, in the preheating zone Z1 and/or the heat-fixing zone Z3, a heating portion 11 (see FIGS. 6 and 9 and like) is provided that asymmetrically heats the film in the width direction, which will be described later.

The preheating zone Z1 refers to a zone which is located, in the heating zone Z, on the upstream side with respect to the stretching zone Z2, and in which the film is transported with both ends of the film held by the holding members Ci and Co.

The stretching zone Z2 refers to a zone where the interval between the holding members Ci and Co holding the film at both ends widens until it becomes equal to a predetermined interval. Meanwhile, oblique stretching as described above is performed; as necessary, before or after oblique stretching, longitudinal or lateral stretching may also be performed.

The heat-fixing zone Z3 refers to a zone which is located on the downstream side with respect to the stretching zone Z2, and in which the film is transported with both ends of the film held by the holding members Ci and Co.

Incidentally, the film after stretching may pass through a zone where the temperature therewithin is set equal to or less than the glass transition temperature Tg (° C.) of the thermoplastic resin forming the film. Here, shrinkage of the film due to cooling may be taken into consideration by adopting a rail pattern that previously narrows the interval between the opposite holding members Ci and Co.

With respect to the glass transition temperature Tg of the thermoplastic resin, it is preferable to set the temperature in the preheating zone Z1 in the range of Tg to Tg+30° C., the temperature in the stretching zone Z2 in the range of Tg to Tg+30° C. and the temperature in the heat-fixing zone Z3 in the range of Tg−30 to Tg° C.

To control film thickness unevenness in the width direction, in the stretching zone Z2, a temperature difference may be introduced in the width direction. To introduce a temperature difference in the width direction in the stretching zone Z2, it is possible to use methods such as one in which nozzles for blowing heated wind into the thermostatic chamber are opened to different degrees in the width direction and one in which heating is controlled with heaters arranged side by side in the width direction. The lengths of the preheating zone Z1, the stretching zone Z2 and the heat-fixing zone Z3 are selected as necessary. With respect to the length of the stretching zone Z2, the length of the preheating zone Z1 is typically 100 to 150% and the length of the heat-fixing zone Z3 is typically 50 to 100%.

Let the width of the film before stretching be Wo (mm) and the width of the film after stretching be W (mm), then the stretching factor R (W/Wo) in the stretching step is preferably 1.3 to 3.0, and more preferably 1.5 to 2.8. With the stretching factor within these ranges, thickness unevenness in the width direction of the film is preferably small. In the stretching zone Z2 of the oblique stretching tenter, introducing a difference in the stretching temperature in the width direction makes it possible to more satisfactorily suppress width-direction thickness unevenness. Incidentally, the above-mentioned stretching factor R is equal to the factor (W2/W1) by which the interval W1 between the clips at both ends when starting to hold in the entrance portion of the tenter widens to the interval W2 in the exit portion of the tenter.

<Quality of the Long Stretched Film>

In the long stretched film obtained by the manufacturing method according to the present embodiment, it is preferable that the orientation angle θ be inclined, for example, in the range of more than 0° but less than 90° relative to the winding direction, and that, in the width direction, over a width of at least 1300 mm, the variation of the in-plane retardation Ro be 2 nm or less and the variation of the orientation angle θ be 0.5° or less.

That is, in the long stretched film obtained by the manufacturing method according to the present embodiment, it is preferable that the variation of the in-plane retardation Ro be, over at least 1300 mm in the width direction, 2 nm or less, and preferably 1 nm or less. By controlling the variation of the in-plane retardation Ro within the above-mentioned range, when the long stretched film is bonded to a polarizer to form a circular polarizing plate and this is applied to an organic EL image display device, it is possible to suppress variations in the amount of light reflected due to leakage of reflected external light during display of black. Also, when the long stretched film is used, for example, as a retardation film in a liquid crystal display device, it is possible to obtain satisfactory display quality.

In the long stretched film obtained by the manufacturing method according to the present embodiment, it is preferable that the variation of the orientation angle θ be, over at least 1300 mm in the width direction, 0.5° or less, preferably 0.3° or less and most preferably 0.1° or less. When the long stretched film with a variation more than 0.5° in the orientation angle θ is bonded to a polarizer to form a circular polarizing plate and this is installed in an image display device such as an organic EL image display device, light leakage occurs, possibly leading to lowered contrast between bright and dim.

For the in-plane retardation Ro of the long stretched film obtained by the manufacturing method according to the present embodiment, an optimum value is selected according to the design of the display device in which it is used. Incidentally, Ro has the value calculated by taking the difference between the refractive index nx in the in-plane slow axis direction and the refractive index ny in a direction perpendicular to the slow axis in the plane and then multiplying the difference by the average thickness d of the film, that is, (Ro=(nx−ny)×d).

The average thickness of the long stretched film obtained by the manufacturing method according to the present embodiment is, from the viewpoints of mechanical strength etc., preferably 10 to 80 μm, more preferably 15 to 60 μm and particularly preferably 20 to 50 μm. The width-direction thickness unevenness in the long stretched film, since this affects windability, is preferably 3 μm or less and more preferably 2 μm or less.

<Circular Polarizing Plate>

In the circular polarizing plate according to the present embodiment, a polarizing plate protection film, a polarizer and a λ/4 retardation film are stacked in this order, and the angle between the slow axis of the λ/4 retardation film and the absorption axis (or transmission axis) of the polarizer is 45°. The polarizing plate protection film, the polarizer and the λ/4 retardation film correspond respectively to a protection film 313, a polarizer 312 and a λ/4 retardation film 311 in FIG. 5. In the present embodiment, it is preferable that the polarizing plate protection film, the polarizer and the λ/4 retardation film (long stretched film) are formed by being stacked in this order.

In the circular polarizing plate according to the present embodiment, used as the polarizer is one manufactured by stretching polyvinyl alcohol doped with iodine or a dichroic dye, and it can be manufactured in a form bonded in the structure of λ/4 retardation film/polarizer. The polarizer has a film thickness in the range of 5 to 40 μm, preferably 5 to 30 μm and particularly preferably 5 to 20 μm.

The polarizer can be manufactured by a common method. It is preferable that an alkali-saponified λ/4 retardation film be bonded, by use of a water solution of fully saponified polyvinyl alcohol, to one side of a polarizer manufactured by immersion-stretching a polyvinyl alcohol film in an iodine solution.

The polarizing plate can further be formed by bonding a releasable film on the side of the polarizer opposite to the polarizing plate protection film. The protection film and the releasable film are used for the purpose of protecting the polarizing plate during product shipment, inspection, etc.

<Organic EL Image Display Device>

Figure 5:
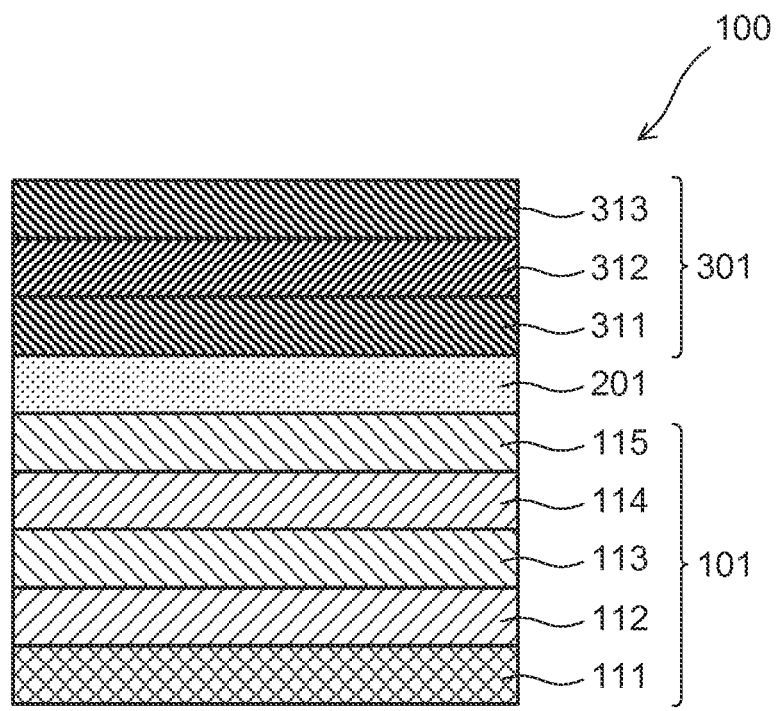
FIG. 5 A cross-sectional view showing an outline configuration of an organic EL image display device according to the above embodiment.

FIG. 5 is a cross-sectional view showing an outline configuration of an organic EL image display device 100 according to the present embodiment. This, however, is not meant to limit the configuration of the organic EL image display device 100.

The organic EL image display device 100 is formed by forming a circular polarizing plate 301 on top of an organic EL element 101 via an adhesive layer 201. The organic EL element 101 is formed by forming a metal electrode 112, a light emission layer 113, a transparent electrode (such as ITO) 114 and a sealing layer 115 in this order on top of a substrate 111 of glass, polyimide or the like. The metal electrode 112 may be composed of a reflective electrode and a transparent electrode.

The circular polarizing plate 301 is composed of a λ/4 retardation film 311, a polarizer 312 and a protection film 313 stacked in this order from the organic EL element 101 side, and the polarizer 312 is held between the λ/4 retardation film 311 and the protection film 313. The circular polarizing plate 301 is built by bonding together the polarizer 312 and the λ/4 retardation film 311 made of the obliquely stretched long film of the present embodiment such that the angle between the transmission axis of the former and the slow axis of the latter equals about 45° (or 135°).

It is preferable that a hardening layer be stacked on the protection film 313. The hardening layer not only prevents scratches on the surface of the organic EL image display device but also prevents warping ascribable to the circular polarizing plate 301. A reflection prevention layer may be formed further on the hardening layer. The organic EL element 101 itself has a thickness of about 1 μm.

In the configuration described above, when a voltage is applied to the metal electrode 112 and the transparent electrode 114, electrons and holes are injected into the light emission layer 113 from whichever of the metal electrode 112 and the transparent electrode 114 act as a cathode and an anode respectively. In the light emission layer 113, the electrons and the holes recombine to cause light emission of visible light corresponding to the light emission characteristics of the light emission layer 113. The light produced in the light emission layer 113 is directly, or after being reflected off the metal electrode 112, extracted via the transparent electrode 114 and the circular polarizing plate 301.

In general, in an organic EL image display device, on a transparent substrate, a metal electrode, a light emission layer and a transparent electrode are stacked in this order to form an element (organic EL element) as a light-emitting member. Here, the light emission layer is a stack of various organic thin films, and as such stacks, various combinations are known, including, for example a stack of a hole injection layer of a triphenylamine derivative or the like and a light emission layer of a fluorescent organic solid such as anthracene, a stack of such a light emission layer and an electron injection layer of a perylene derivative or the like and a stack of such a hole injection layer, a light emission layer and an electron injection layer.

An organic EL image display device emits light according to the following principle: applying a voltage to the transparent electrode and the metal electrode causes holes and electrons to be injected into the light emission layer; the energy produced as the holes and the electrons recombine excites a fluorescent substance; the excited fluorescent substance radiates light while returning to the ground state. Here, the mechanism of recombination is the same as in common diodes, and as will be expected from this fact, the current and the light emission intensity exhibit, with respect to the applied voltage, a marked non-linearity accompanied by a rectifying property.

In an organic EL image display device, to allow extraction of light from the light emission layer, at least one electrode needs to be transparent, and typically a transparent electrode formed of a transparent electrically conductive material such as indium tin oxide (ITO) is used as the anode. On the other hand, to facilitate electron injection and increase light emission efficiency, it is important to use for the cathode a substance with a small work function, and typically a metal electrode of Mg—Ag, Al—Li, or the like is used.

In an organic EL image display device configured as described above, the light emission layer is formed as a very thin film with a thickness of about 10 nm. Thus, the light emission layer, like the transparent electrode, fully transmits light. As a result, when no light is being emitted, the light that enters through the front side of the transparent substrate is transmitted through the transparent electrode and the light emission layer and is then reflected off the metal electrode to exit back to the front side of the transparent substrate. Thus, when viewed from the outside, the display surface of the organic EL image display device appears to be a mirror surface.

The circular polarizing plate according to the present embodiment is suitable in an organic EL image display device where such reflection of external light causes a problem.

Specifically, when the organic EL element 101 is not emitting light, the external light, such as of indoor lighting, that enters the organic EL element 101 is half absorbed by the polarizer 312 of the circular polarizing plate 301, and is half transmitted as linear polarized light to enter the λ/4 retardation film 311. The light that has entered the λ/4 retardation film 311 is, by being transmitted through the λ/4 retardation film 311, converted into circular polarized light owing to the polarizer 312 and the λ/4 retardation film 311 being arranged such that the transmission axis of the former and the slow axis of the latter cross each other at 45° (or 135°).

The circular polarized light that has exited from the λ/4 retardation film 311 is, when reflected off the mirror surface of the metal electrode 112 of the organic EL element 101, converted to have a 180 degrees inverted phase, and is thus reflected as circular polarized light of the opposite rotation. The reflected light is, by entering the λ/4 retardation film 311, converted into linear polarized light perpendicular to the transmission axis (parallel to the absorption axis) of the polarizer 312, and is thus totally absorbed by the polarizer 312 so as not to emerge outside. Thus, the circular polarizing plate 301 can reduce reflection of external light on the organic EL element 101.

<Heating Portion and its Arrangement>

The heating portion provided in the heating zone Z described above will then be described. FIG. 6 is a cross-sectional view of the stretching portion 5 in the present embodiment, taken along the transport direction of the film. The stretching portion 5 includes the heating portion 11 that asymmetrically heats the film F in the width direction at least either before or after the stretching of the film F. In FIG. 6, the heating portion 11 is provided in the heat-fixing zone Z3 located on the downstream side in the transport direction of the film F with respect to the stretching zone Z2, and forms a first heating portion that heats the film F after the stretching. The asymmetrical heating in the width direction means heating such that a temperature distribution in the width direction at the time of heating is asymmetrical with respect to the center of the film in the width direction; in order to reduce bowing, it is necessary to perform heating such that the position where a temperature in the temperature distribution of the film at the time of heating is maximized is present between the center portion and any one of the end portions in the width direction. Although the heating portion 11 is provided such that their parts are opposite each other through a transport path, and thereby heats the film F from both sides, the upper surface side and the lower surface side, the heating portion 11 is provided either on the upper side or the lower side with respect to the transport path of the film F, with the result that the film F may be heated from only the upper surface side or the lower surface side.

Although the heating portion 11 is formed with, for example, a lamp heater made of a halogen lamp, the heating portion 11 may be formed with a panel heater, a slit nozzle for discharging heat air or a combination of a punch plate nozzle and a wind shielding plate. When the heating portion 11 is formed with the punch plate nozzle and the wind shielding plate, in the region other than the opening portion of the wind shielding plate, part of a plurality of holes in the punch plate nozzle is shielded, and thus it is possible to heat the film by blowing hot air from the remaining holes in the punch plate nozzle through the opening portion of the wind shielding plate.

Figure 7:
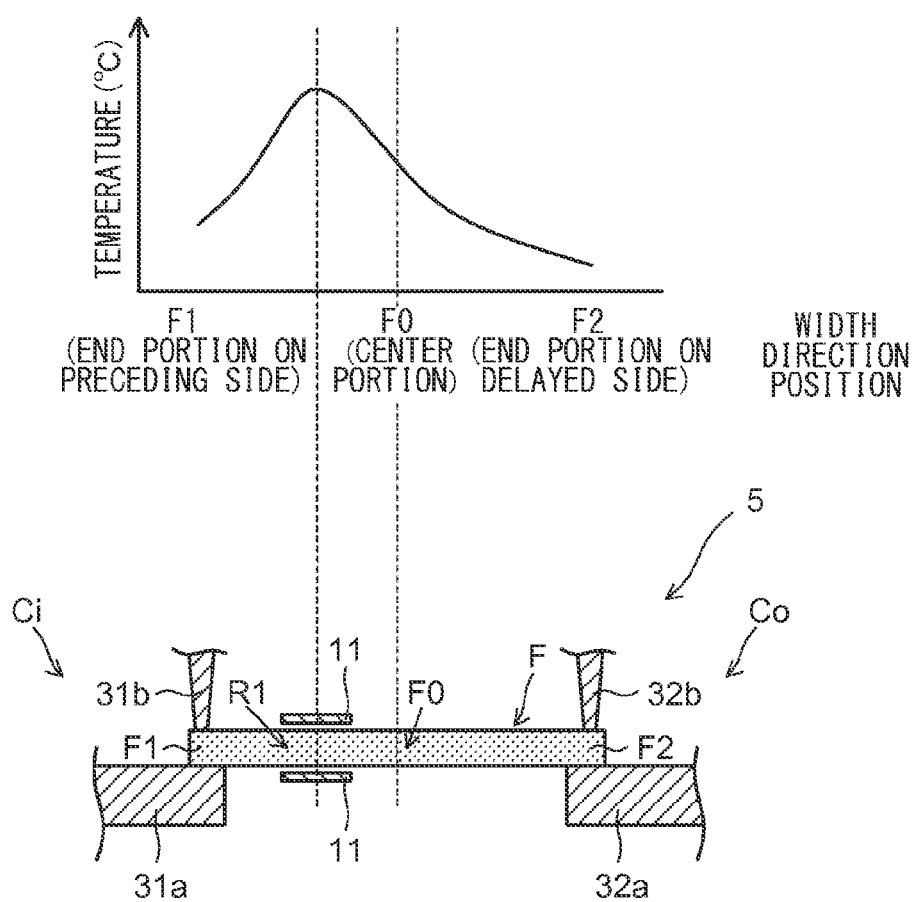
FIG. 7 A cross-sectional view of the heat-fixing zone of the stretching portion in the vicinity of the film and a graph showing the temperature distribution of the film.

FIG. 7 shows both a cross-sectional view of the heat-fixing zone Z3 in the vicinity of the film F and the temperature distribution of the film F. Here, among the pair of holding members Ci and Co holding both end portions of the film F, the holding member Ci traveling relatively in a preceding manner includes a clip main body 31a and a clip lever 31b. With these, one end portion F1 (preceding side) in the width direction of the film F is held. The holding member Co traveling relatively in a delayed manner includes a clip main body 32a and a clip lever 32b. With these, the other end portion F2 (delayed side) in the width direction of the film F is held.

The heating portion 11 is provided in positions opposite a region R1, at the time of transport of the film F, between the center portion F0 in the width direction of the film F and the end portion F1 on the preceding side at the time of stretching. In this way, in the width direction of the film F, the position where the temperature in the temperature distribution at the time of heating by the heating portion 11 is maximized can be present only between the center portion F0 in the width direction of the film F and the one end portion F1, with the result that the temperature distribution can be asymmetrical with respect to the center in the width direction, that is, the film F can be asymmetrically heated in the width direction of the film F.

When the length of the film F in the width direction in the heat-fixing zone Z3 is assumed to be d (mm), the heating portion 11 is preferably arranged opposite the region R1 that includes the position of d/100 from the preceding side in the width direction of the film F and that is located between d/100 and 50d/100 (the position of 50d/100 is not included) on the center side with respect to the position of d/100 in the width direction. The heating portion 11 is more preferably arranged opposite the region R1 that is located between the position of d/10 from the preceding side in the width direction of the film F and the position of 4d/10 from the preceding side (the position of d/10 and the position of 4d/10 are included). The heating portion 11 is most preferably arranged opposite the region R1 that is located between the position of 2d/10 from the preceding side in the width direction of the film F and the position of 4d/10 from the preceding side (the position of 2d/10 and the position of 4d/10 are included).

Although in addition to the maximum value of the temperature between the center portion in the width direction and the end portion on the preceding side at the time of stretching, a second maximum value may be present between the center portion in the width direction and the end portion on the delayed side at the time of stretching, in that case, a temperature difference between the first maximum value and the second maximum value is preferably 1° C. or more, is more preferably 2° C. or more and is most preferably 3° C. or more.

Figure 8:
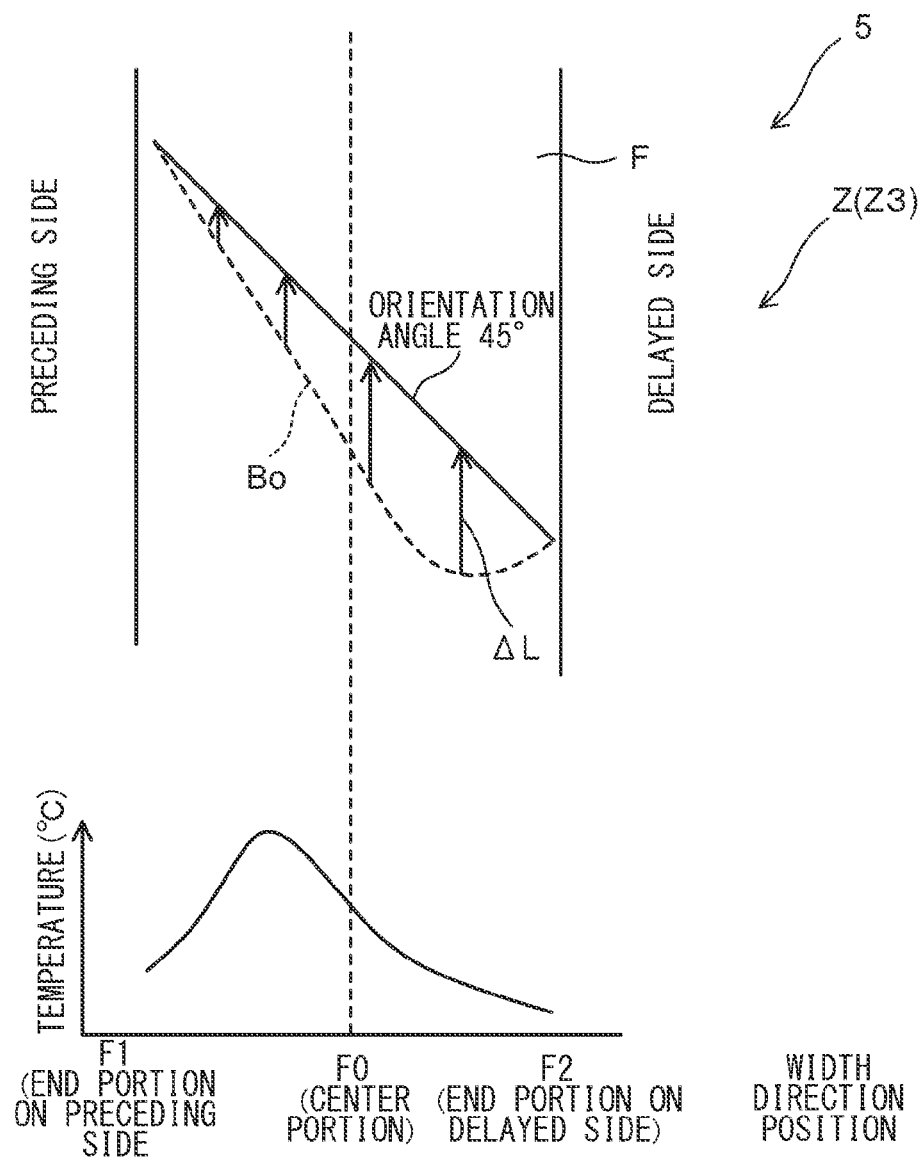
FIG. 8 An illustrative diagram schematically showing a state where bowing produced at the time of stretching is suppressed by the heating of a heating portion provided in the heat-fixing zone.

FIG. 8 schematically shows a state where bowing Bo produced at the time of stretching is suppressed by the heating of the heating portion 11. In FIG. 8, the bowing Bo is exaggerated so that the bowing Bo is easily regarded as an image. As described above, the heating portion 11 asymmetrically heats the film F in the width direction, and thus the delayed side is relatively cooled as compared with the preceding side with respect to the center portion F0 of the film F. In this way, as compared with the preceding side of the film F, on the delayed side, the film contracts more in the transport direction, and is pulled more to the downstream side.

Although when the bowing Bo is asymmetrically produced in the width direction of the film, as compared with the preceding side, on the delayed side, the amount of displacement from a desired angle (for example 45°) of the orientation angle caused by the bowing Bo is increased, the degree of contraction in the transport direction can be changed in the width direction by the asymmetrical heating in the width direction described above. In this way, in the individual positions of the film F in the width direction, the film is made to further proceed, by an amount ΔL (mm) corresponding to the amount of displacement from the desired angle of the orientation angle caused by the bowing Bo, to the downstream side in the transport direction simultaneously with the transport, with the result that it is possible to suppress the bowing Bo asymmetrical produced in the width direction. Consequently, the amount of displacement of the orientation angle is reduced over the width direction, and thus it is possible to obtain the film F having satisfactory optical properties in which the orientation angles are aligned to be the desired angle.

Hence, when the film F is applied to a circular polarizing plate for external light reflection prevention in a large-sized organic EL image display device, it is possible to reduce variations in the amount of light reflected due to leakage of light in the circular polarizing plate during display of black.

Figure 9:
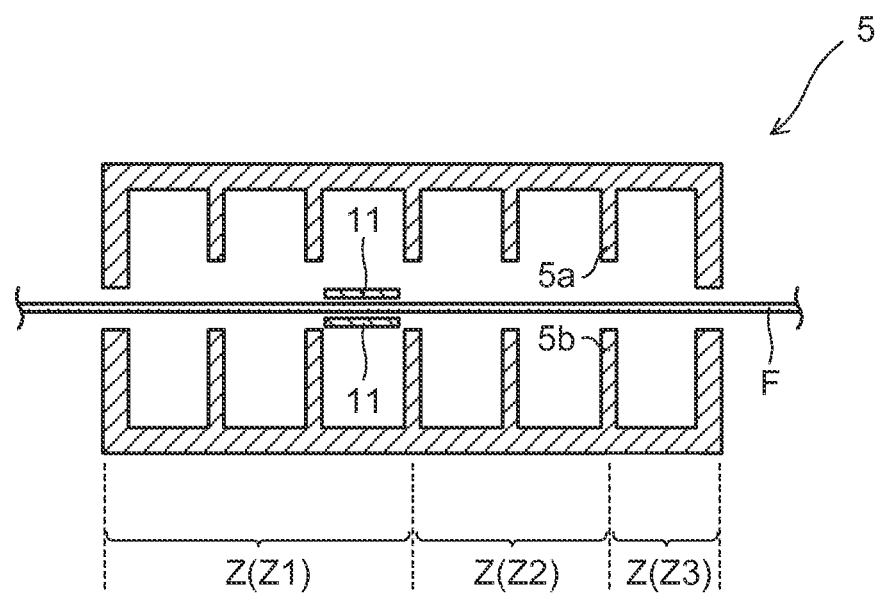
FIG. 9 A cross-sectional view of the stretching portion in which the heating portion is arranged in a preheating zone, taken along the transport direction of the film.

FIG. 9 is a cross-sectional view of the stretching portion 5 in which the heating portion 11 is arranged in the preheating zone Z1, taken along the transport direction of the film. Specifically, FIG. 9 shows a configuration in which in the preheating zone Z1 located on the upstream side in the transport direction of the film F with respect to the stretching zone Z2, the heating portion 11 is arranged as a second heating portion, and in which the film F is asymmetrically heated in the width direction of the film F before the stretching of the film F.

Figure 10:
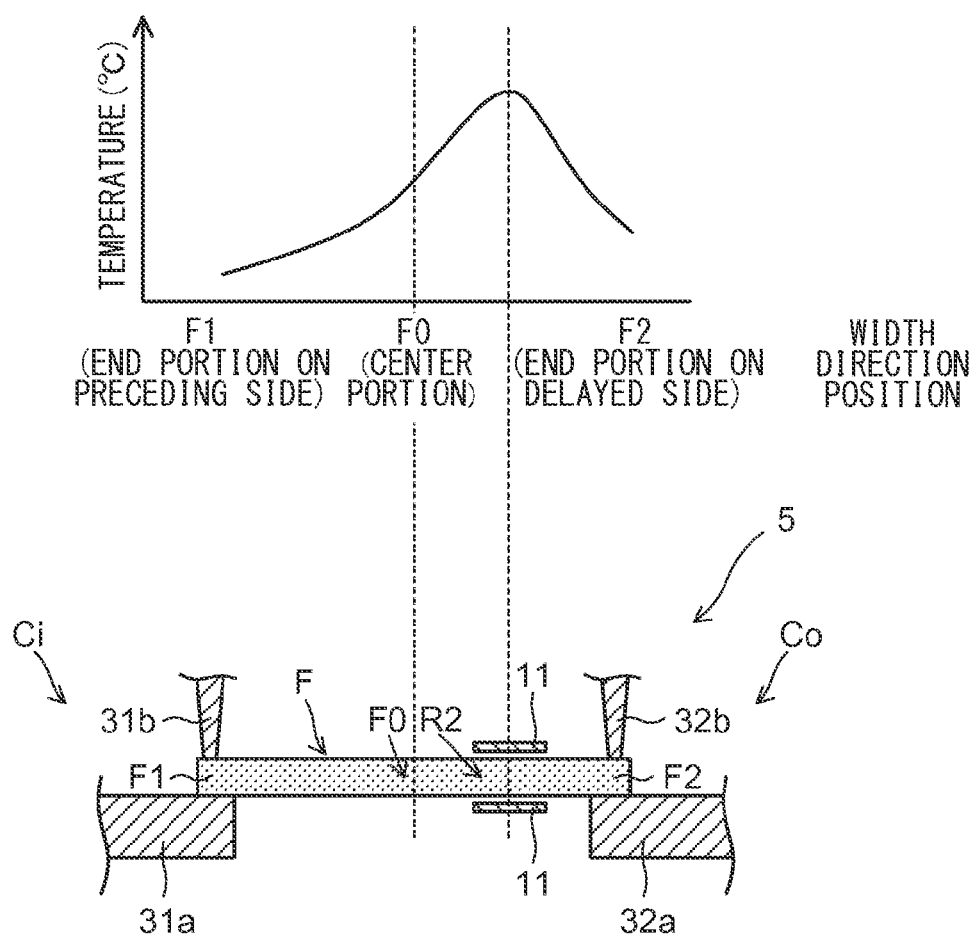
FIG. 10 A cross-sectional view of the preheating zone in the vicinity of the film and a graph showing the temperature distribution of the film.

FIG. 10 shows both a cross-sectional view of the preheating zone Z1 in the vicinity of the film F and the temperature distribution of the film F. In the preheating zone Z1, the heating portion 11 is provided in positions opposite a region R2, at the time of transport of the film F, between the center portion F0 in the width direction of the film F and the end portion F2 on the delayed side at the time of stretching. In this case, in the width direction of the film F, the position where the temperature in the temperature distribution at the time of heating by the heating portion 11 is maximized can be present only between the center portion F0 in the width direction of the film F and the end portion F2, with the result that the temperature distribution is asymmetrical with respect to the center in the width direction. Hence, even in this case, the film F is also asymmetrically heated in the width direction.

When the length of the film F in the width direction in the preheating zone Z1 is assumed to be d' (mm), the heating portion 11 serving as the second heating portion is preferably arranged opposite the region R2, at the time of transport of the film F, that includes the position of 9d'/10 from the preceding side in the width direction of the film F and that is located on the center side in the width direction with respect to the position of 9d'/10. More specifically, the heating portion 11 is preferably arranged opposite the region R2 that is located between the position of 6d'/10 from the preceding side in the width direction of the film F and the position of 9d'/10 from the preceding side (the position of 6d'/10 and the position of 9d'/10 are included).

Figure 11:
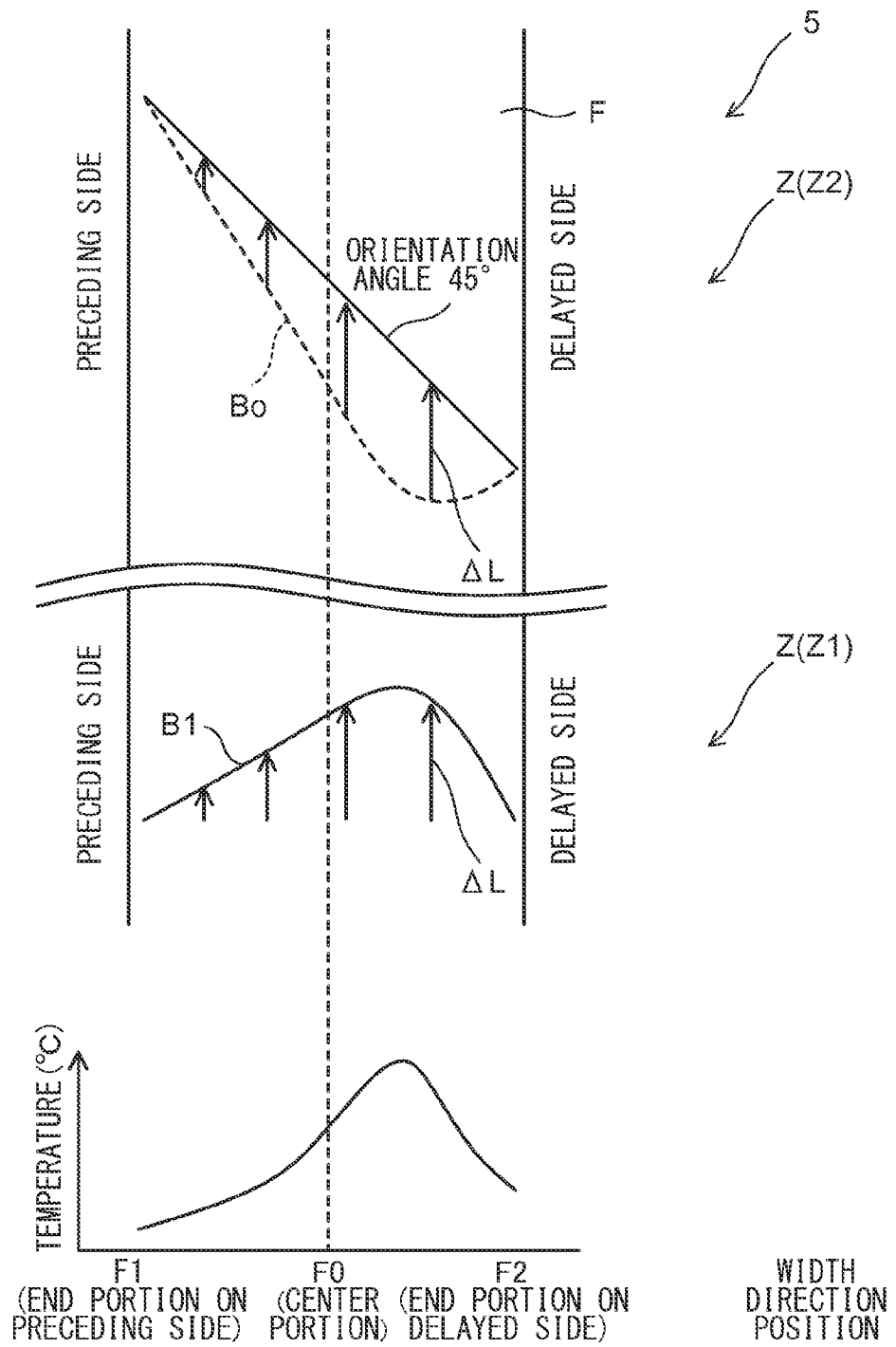
FIG. 11 An illustrative diagram schematically showing a state where bowing produced at the time of stretching is suppressed by the heating of the heating portion in the preheating zone.

FIG. 11 schematically shows a state where the bowing Bo produced at the time of stretching is suppressed by the heating of the heating portion 11 in the preheating zone Z1. In FIG. 11, the bowing Bo and bowing B1 are exaggerated so that the bowing Bo and the bowing B1 are easily regarded as an image. As described above, the heating portion 11 asymmetrically heats the film F in the width direction, and thus the delayed side is relatively warmed as compared with the preceding side with respect to the center portion F0 of the film F. In this way, as compared with the preceding side of the film F, on the delayed side, the film extends more to the downstream side in the transport direction, and thus it is possible to produce the bowing B1 that is bent in the direction opposite to the bowing Bo that is produced at the time of stretching. Specifically, in the preheating zone Z1, due to the asymmetrical heating, in the individual positions of the film F in the width direction, the film is made to further proceed, by an amount ΔL corresponding to the amount of displacement from the desired angle of the orientation angle caused by the bowing Bo at the time of stretching, to the downstream side in the transport direction simultaneously with the transport, with the result that it is possible to produce the bowing B1 in the opposite direction before stretching.

Hence, when the film F is stretched in the stretching zone Z2, the bowing Bo asymmetrically produced in the width direction of the film F is suppressed by the bowing B1 in the opposite direction produced in the preheating zone Z1, with the result that it is possible to reduce the amount of displacement of the orientation angle over the width direction. Thus, even in this case, it is also possible to obtain the film F having satisfactory optical properties in which the orientation angles are aligned to be the desired angle.

Figure 12:
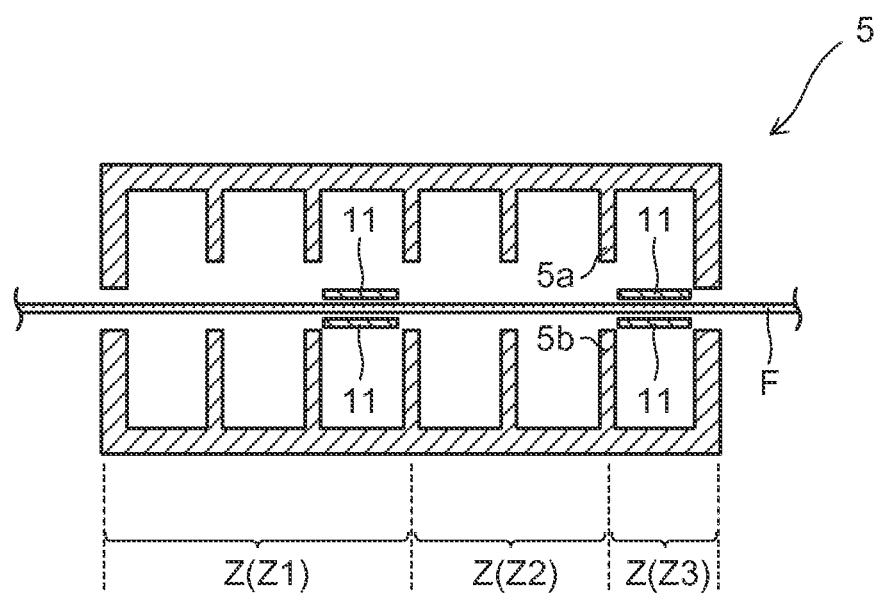
FIG. 12 A cross-sectional view of the stretching portion in which the heating portion is arranged both in the preheating zone and the heat-fixing zone, taken along the transport direction of the film.

FIG. 12 is a cross-sectional view of the stretching portion 5 in which the heating portion 11 is arranged both in the preheating zone Z1 and the heat-fixing zone Z3, taken along the transport direction of the film. The heating portion 11 is arranged both in the preheating zone Z1 and the heat-fixing zone Z3 as described above, and thus the film F may be asymmetrical heated in the width direction. In other words, the stretching portion 5 may include both the heating portion 11 that is provided as the first heating portion in the heat-fixing zone Z3 and the heating portion 11 that is provided as the second heating portion in the preheating zone Z1. Even in this case, in each of the preheating zone Z1 and the heat-fixing zone Z3, the temperature distribution in the width direction of the film at the time of heating by the heating portion 11 is appropriately controlled, and thus in the individual positions of the film F in the width direction, the film is made to further proceed, by an amount corresponding to the amount of displacement from the desired angle of the orientation angle caused by the bowing at the time of stretching, to the downstream side in the transport direction simultaneously with the transport, with the result that it is possible to suppress the bowing produced at the time of stretching.

As described above, in the present embodiment, in the stretching zone Z2, the stretching portion 5 holds both end portions of the film (long film) in the width direction with the holding members Ci and Co, transports the film while the holding members Ci and Co are being moved, and changes the transport direction of the film partway, with the result that the film is stretched in an oblique direction with respect to the width direction of the film. When the film is obliquely stretched by such a method, variations in the orientation angle in the width direction are easily produced by the bowing described above. In particular, since when the transport speed of the film is relatively fast so as to be 15 m/min to 150 m/min, it is thought that a stretching stress at the time of oblique stretching is increased and that asymmetrical bowing is increased, the variations described above are more easily produced. Since in the conventional technology, it is impossible to reduce the increased asymmetrical bowing over the width direction, the configuration of the present embodiment in which the film F is asymmetrically heated in the width direction, the bowing produced at the time of stretching is suppressed and thus it is possible to reduce the displacement (variations) from the desired angle of the orientation angle in the width direction is significantly effective for a case where oblique stretching is performed by the method described above. In particular, it is more effective for a case where the film is transported within the speed range described above.

The stretching portion 5 is not limited to the configuration in which oblique stretching is performed by the method described above; for example, the configuration disclosed in Japanese Patent Application Publication No. 2008-23775 in which simultaneous biaxial stretching is performed may be adopted. The simultaneous biaxial stretching is a method in which both end portions of a long film supplied are held by holding members, the long film is transported while the holding members are being moved, the movement speed of one holding member is made to differ from the movement speed of the other holding member while the transport direction of the long film is kept constant and thus the long film is stretched in an oblique direction with respect to the width direction. Even if the stretching portion 5 performs oblique stretching by simultaneous biaxial stretching, the film is asymmetrically heated in the width direction, with the result that it is possible to obtain the effects of the present embodiment. Even in the configuration of stretching disclosed in Japanese Patent Application Publication No. 2011-11434, the film is asymmetrically heated in the width direction, with the result that it is possible to obtain the effects of the present embodiment.

As described above, when the stretching portion 5 is configured such that the film is transported with one end side in the width direction moved relatively in a preceding manner and the other end side moved relatively in a delayed manner and that thus the film is stretched in an oblique direction with respect to the width direction, it is possible to apply the configuration of the present embodiment in which the film is asymmetrically heated in the width direction.

EXAMPLES

Hereinafter, in connection with the manufacturing of the stretched film according to the present embodiment, examples will be described specifically along with a comparative example. The examples presented below are in no way meant to limit the present invention. In the examples described below, a thermoplastic resin film is formed, and then the thermoplastic resin film is stretched by use of the stretching portion 5 shown in FIG. 4 to produce an obliquely stretched optical film. In the following description, the notations "part(s)" and "%" mean "part(s) by mass" and "% by mass" respectively unless otherwise indicated.

Example 1

Manufacturing Method of a Cycloolefin Film

In a nitrogen atmosphere, 500 parts of dehydrated cyclohexane was put and mixed with 1.2 parts of 1-hexene, 0.15 parts of dibutylether and 0.30 parts of triisobutylaluminum in a reactor vessel at room temperature. Then, while the mixture was kept at 45° C., a norbornene monomer mixture composed of 20 parts of tricyclo[4.3.0.12,5]deca-3,7-diene (dicyclopentadiene, hereinafter abbreviated to DCP), 140 parts of 1,4-methano-1,4,4a,9a-tetrahydrofluorene (hereinafter abbreviated to MTF) and 40 parts of 8-methyl-tetracyclo[4.4.0.12,5.17,10]-dodeca-3-ene (hereinafter abbreviated to MTD) as well as 40 parts of tungsten hexachloride (a 0.7% solution in toluene) were added to the solution continuously for two hours to achieve polymerization. To the polymerized solution, 1.06 parts of butyl glycidyl ether and 0.52 parts of isopropyl alcohol were added to inactivate the polymerization catalyst and stop the polymerization reaction.

Next, to 100 parts of the obtained reaction solution containing a ring-opening polymer, 270 parts of cyclohexane was added, and moreover, as a hydrogenation catalyst, 5 parts of nickel-alumina catalyst (manufactured by Nikki Chemicals Co.) was added. Then, under application of a pressure of 5 MPa with hydrogen accompanied by stirring, the mixture was heated up to 200° C. and subjected to a reaction for four hours to obtain a reaction solution containing 20% of a hydrogenated polymer of DCP/MTF/MTD ring-opening polymers. After removal of the hydrogenation catalyst by filtration, a soft polymer (SEPTON 2002 manufactured by Kuraray Co., Ltd.) and an antioxidant (IRGANOX 1010 manufactured by Ciba Specialty Chemicals plc.) were added to and dissolved in the obtained solution (0.1 parts of each in 100 parts of the polymer).

Next, cyclohexane as the solvent and other volatile components were removed from the solution by use of a cylindrical concentration dryer (manufactured by Hitachi Ltd.), the hydrogenated polymer in a melted state was extruded from an extruder in the form of a strand, and was, after cooling, pelletized and collected. The copolymerization ratio of the respective norbornene monomers in the polymer was calculated based on the composition of the residual norbornene species in the solution after polymerization (by gas chromatography), and the result, DCP/MTF/MTD=10/70/20, was approximately equal to the charged composition. The obtained hydrogenated polymer of ring-opening polymers had a weight-average molecular weight (Mw) of 31,000, a molecular weight distribution (Mw/Mn) of 2.5, a hydrogenation ratio of 99.9% and a Tg of 134° C.

The obtained pellets of the hydrogenated polymer of ring-opening polymers were dried for two hours at 70° C. by use of a hot wind drier through which air was circulated, to remove moisture. Next, the pellets were subjected to melt extrusion molding on a single-axis extruder (manufactured by Mitsubishi Heavy Industry Co., Ltd., with a screw diameter of 90 mm, with a T die rip part formed of tungsten carbide, and with a release strength of 44 N with respect to the melted resin) having a coat hunger-type T die to manufacture a cycloolefin polymer film with a thickness of 75 μm. Extrusion molding was performed in a clean room of class 10,000 or less, under the molding conditions of a melted resin temperature of 240° C. and a T-die temperature of 240° C., so as to obtain a long unstretched film A with a width of 1000 mm. The unstretched film A was wound up into a roll.

The unstretched film A of the norbornene resin obtained as described above was stretched, by the stretching portion 5 (see FIG. 4 etc.) of the manufacturing system 1 according to the present embodiment, in the following manner to obtain a stretched film A'. Here, in the stretching portion 5 shown in FIG. 4, the angle θi between the dispensing direction D1 and the winding direction D2 of the film was 48°.

First, in the upstream-side vicinity of the heating zone Z, both ends of the unstretched film A dispensed from the film dispensing portion 2 were held with a first clip as the holding member Ci on the preceding side and a second clip as the holding member Co on the delayed side. The holding of the unstretched film A was achieved by moving clip levers of the first and second clips with a clip closer. And the clip-holding was done such that both ends of the unstretched film A were simultaneously held by the first and second clips, and that the line connecting the held positions at both ends was parallel to an axis parallel to the width direction of the film.

Next, the held unstretched film A was, in the state held by the first and second clips, transported, and was meanwhile heated by being passed through the preheating zone Z1, the stretching zone Z2, and the heat-fixing zone Z3 in the heating zone Z, and thus a stretched film A' stretched in the oblique direction with respect to the width direction (the direction of 45° with respect to the width direction) was obtained.

The film movement speed during heating and stretching was 30 m/minute. The temperatures in the preheating zone Z1, the stretching zone Z2, and the heat-fixing zone Z3 were 140° C., 140° C., and 137° C., respectively. The stretching factor of the film before and after stretching was 2.0, so that the film after stretching had a thickness of 52 μm and a width of 2000 mm.

In the stretching portion 5, the heating portion 11 was arranged only in the preheating zone Z1, and the stretched film A' was asymmetrically heated in the width direction. Here, in the preheating zone Z1, the heating portion 11 was arranged in a position where the distance from the preceding side was three-fourths the length of the film in the width direction.

Figure 13:
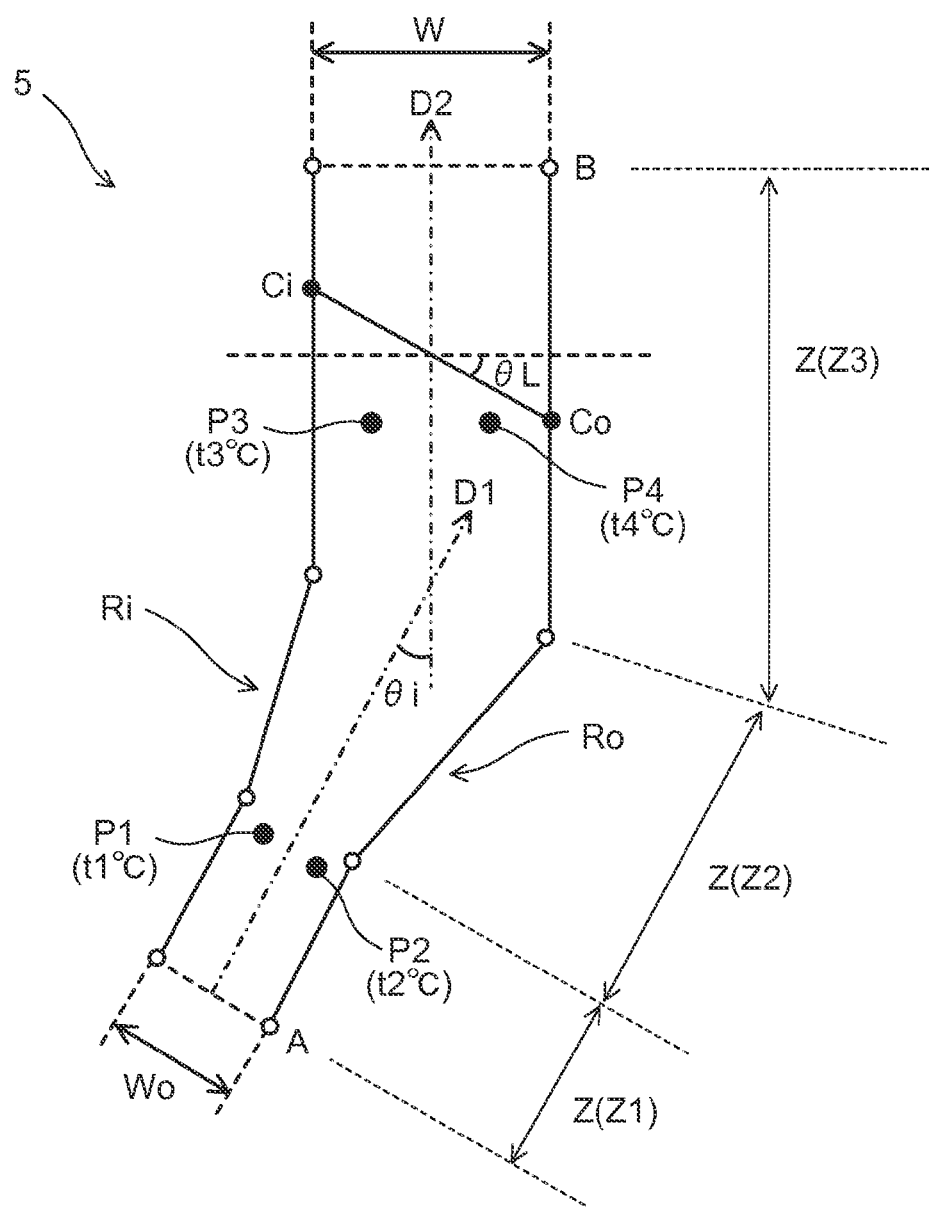
FIG. 13 An illustrative diagram schematically showing a position where the heating portion is arranged in the stretching portion.
Figure 14:
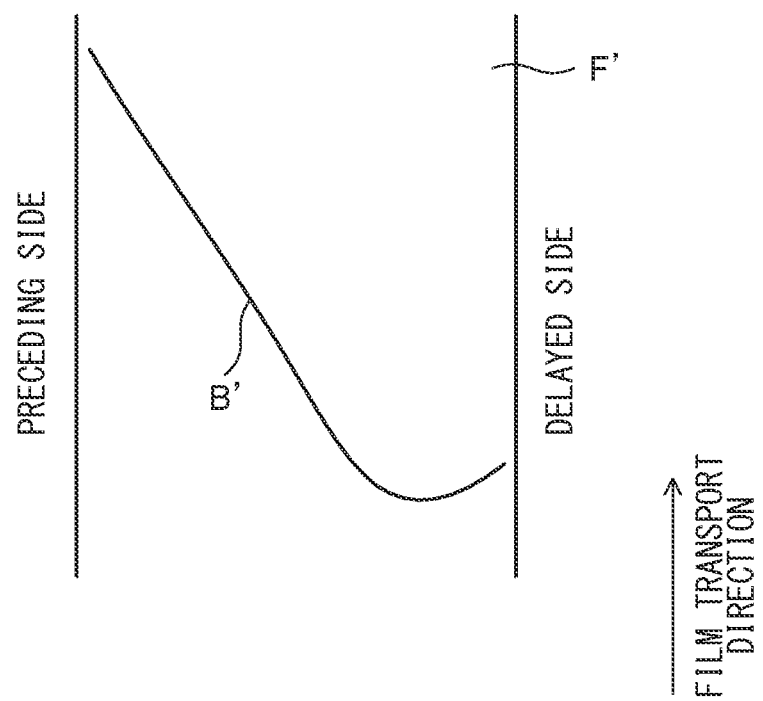
FIG. 14 An illustrative diagram schematically showing bowing asymmetrically produced in the width direction of the film.

As shown in FIG. 13, in the preheating zone Z1, a temperature difference (t1−t2) between a temperature t1 (° C.) in a position P1 where the distance from the preceding side is one-fourth the length of the film in the width direction and a temperature t2 (° C.) in a position P2 where the distance from the preceding side is three-fourths the length of the film in the width direction was −3° C.

Although in the heat-fixing zone Z3, a temperature difference (t3–t4) between a temperature t3 (° C.) in a position P3 where the distance from the preceding side is one-fourth the length of the film in the width direction and a temperature t4 (° C.) in a position P4 where the distance from the preceding side is three-fourths the length of the film in the width direction was 0.5° C., this was probably caused by variations in temperature in the width direction within the zone (because in the heat-fixing zone Z3, asymmetrical heating was not performed in the width direction).

Next, both ends of the obtained stretched film A' were trimmed off, so that the film eventually had a width of 1500 mm. The average value of the in-plane retardation of the obtained film was 140 nm, and the average value of the orientation angle θ was 45°.

The cycloolefin polymer film described above is also called a COP film.

[Fabrication of a Circular Polarizing Plate]

A film of polyvinyl alcohol with a thickness of 120 μm was subjected to single-axis stretching (at a temperature of 110° C., at a stretching factor of 5), was then immersed in a water solution containing 0.075 g of iodine, 5 g of potassium iodide and 100 g of water for 60 seconds, and was subsequently immersed in a water solution containing 6 g of potassium iodide, 7.5 g of boric acid and 100 g of water at 68° C. After immersion, the film was cleaned with water and dried to obtain a polarizer.

Subsequently, the stretched film (λ/4 retardation film) prepared by the previously described method was bonded to one side of the above polarizer, by use of a 5% water solution of polyvinyl alcohol as an adhesive. The bonding was done such that the transmission axis of the polarizer and the slow axis of the λ/4 retardation film were so oriented as to form an angle of 45°. In a similar manner, an alkali-saponified Konica Minolta TAC film KC6UA (manufactured by Konica Minolta Opto, Inc.) was bonded to the other side of the polarizer, and thus a circular polarizing plate was prepared.

[Fabrication of an Organic EL Image Display Device]

On a glass substrate, by sputtering, a film of chromium with a thickness of 80 nm was formed as a reflective electrode. Next, on the reflective electrode, as an anode, a film of ITO (indium tin oxide) was formed by sputtering with a thickness of 40 nm. Subsequently, on the anode, as a hole transport layer, a film of poly(3,4-ethylenedioxythiophene)-polystyrenesulfonate (PEDOT:PSS) was formed by sputtering with a thickness of 80 nm. Thereafter, on the hole transport layer, by use of a shadow mask, light emission layers of R, G, and B were formed each with a thickness of 100 nm.

For the red light emission layer, tris(8-hydroxyquinolinato)aluminum ($Alq_3$) as a host and the luminescent compound [4-(dicyanomethylene)-2-methyl-6(p-dimethylaminostyryl)-4H-pyran] (DCM) were co-deposited (in a ratio of 99:1 by mass) into a film with a thickness of 100 nm. For the green light emission layer, $Alq_3$ as a host and the luminescent compound coumarin 6 were co-deposited (in a ratio of 99:1 by mass) into a film with a thickness of 100 nm. For the blue light emission layer, BAlq expressed by the structural formula below as a host and the luminescent compound perylene (in a ratio of 90:10 by mass) into a film with a thickness of 100 nm.

[Chemical Formula 6]

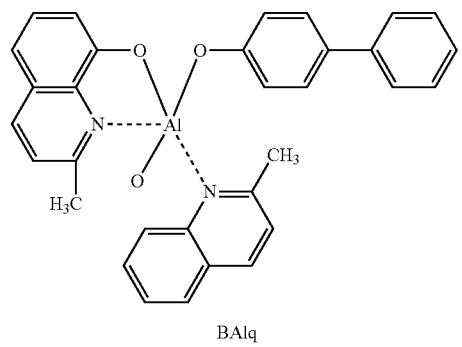

BAlq

Further on the light emission layers, as a first cathode having so low a work function as to allow efficient injection of electrons, a film of calcium was formed with a thickness of 4 nm. Thereafter, on the first cathode, as a second cathode, a film of aluminum was formed with a thickness of 2 nm. Here, the aluminum as the second cathode serves to prevent chemical alteration of the calcium as the first cathode when a film to serve as a transparent electrode is formed further on top by sputtering. Thus, an organic light emission layer was obtained.

Next, on the cathode, by sputtering, a transparent electrically conductive film was formed with a thickness of 80 nm. Here, for the transparent electrically conductive film, ITO was used. Further on the transparent electrically conductive film, by CVD (chemical vapor deposition), a film of boron nitride was formed with a thickness of 200 nm as an insulating film. Thus, an organic EL element was fabricated. The organic EL element fabricated as described above had a light emission area of 1296 mm×784 mm.

On the insulating film of the organic EL element fabricated as described above, the circular polarizing plate fabricated as described previously was fixed with an adhesive with the surface of the λ/4 retardation film facing the insulating film of the organic EL element. Thus, an organic EL image display device was fabricated.

Example 2

In example 2, the heating portion 11 was arranged only in the heat-fixing zone Z3 in the stretching portion 5, and the stretched film A' was asymmetrically heated in the width direction. Here, in the heat-fixing zone Z3, the heating portion 11 was arranged in the position where the distance from the preceding side was one-fourth the length of the film in the width direction. The configuration other than what has been described above was the same as in example 1.

In example 2, in the heat-fixing zone Z3, the temperature difference (t3–t4) between the position P3 and the position P4 was 3° C. Although in the preheating zone Z1, the temperature difference (t1–t2) between the position P1 and the position P2 was 0.5° C., this was probably caused by variations in temperature in the width direction within the zone (because in the preheating zone Z1, asymmetrical heating was not performed in the width direction).

Example 3

In example 3, the heating portion 11 is arranged both in the preheating zone Z1 and the heat-fixing zone Z3 in the stretching portion 5, and the stretched film A' was asymmetrically heated in the width direction. Here, in the preheating zone Z1, the heating portion 11 was arranged in the position where the distance from the preceding side was three-fourths the length of the film in the width direction. In the heat-fixing zone Z3, the heating portion 11 was arranged in the position where the distance from the preceding side was one-fourth the length of the film in the width direction. The configuration other than what has been described above was the same as in example 1.

In example 3, in the heat-fixing zone Z3, the temperature difference (t3−t4) between the position P3 and the position P4 was 3° C., and in the preheating zone Z1, the temperature difference (t1−t2) between the position P1 and the position P2 was −3° C.

Comparative Example 1

In comparative example 1, in the preheating zone Z1 and the heat-fixing zone Z3, asymmetrical heating was not performed. The configuration other than what has been described above was the same as in example 1. Although in the preheating zone Z1, the temperature difference (t1−t2) between the position P1 and the position P2 was 0.5° C., and in the heat-fixing zone Z3, the temperature difference (t3−t4) between the position P3 and the position P4 was 0.5° C., these values were probably caused by variations in temperature in the width direction within each of the zones (because in the preheating zone Z1 and the heat-fixing zone Z3, asymmetrical heating was not performed in the width direction).

<Method of Evaluating Variations in Orientation Angle>

In the obliquely stretched long film (COP film) produced in the same method as in examples 1 to 3 and comparative example 1 described above, a retardation measuring device (KOBRA-WXK made by Oji Scientific Instruments) was used to measure the orientation angle at intervals of 50 mm in the width direction of the stretched long film, and the difference between the maximum value and the minimum value was assumed to be variations (°) in the orientation angle θ. Then, the measurement of the orientation angle θ in the width direction as described above was repeated 100 times every 100 m in the longitudinal direction, and the proportion of measurements where variations in the orientation angle θ in the width direction were within ±0.1° in the 100 measurements in the longitudinal direction was checked. Table 1 shows the results of the evaluation of variations in the orientation angle θ in examples 1 to 3 and comparative example 1.

TABLE 1

|  | Example 1 | Example 2 | Example 3 | Comparative Example 1 |
|---|---|---|---|---|
| Temperature difference t1 − t2 (° C.) | −3 | 0.5 | −3 | 0.5 |
| Temperature difference t3 − t4 (° C.) | 0.5 | 3 | 3 | 0.5 |
| Proportion of measurements where variations in orientation angle θ were within ±0.1° (%) | 60 | 80 | 90 | 30 |

Table 1 shows that in at least either of the preheating zone Z1 and the heat-fixing zone Z3, the film was asymmetrically heated in the width direction, and thus variations in the orientation angle θ in the width direction were reduced. This is probably because the bowing asymmetrically produced in the width direction when the film was obliquely stretched was suppressed by the asymmetrical heating in the width direction, and thus the amount of displacement of the orientation angle from the desired angel was reduced. Hence, the film is asymmetrically heated in the width direction, and thus the bowing asymmetrically produced in the width direction at the time of oblique stretching is suppressed, with the result that it is possible to obtain the stretched film having satisfactory optical properties in which the orientation angles are aligned to be the desired angle over the width direction.

In particular, it is found that as in example 3, both in the preheating zone Z1 and the heat-fixing zone Z3, the film was asymmetrically heated in the width direction, and thus the effect of reducing variations in the orientation angle θ in the width direction was also stabilized in the longitudinal direction.

Although in examples described above, the transport speed of the film in the oblique stretching step was set at 30 m/min, when the transport speed of the film is relatively fast so as to be 15 m/min to 150 m/min, the bowing at the time of oblique stretching is increased, and thus wide variations in the orientation angle are easily produced. This is probably because the increased transport speed causes a stretching stress at the time of oblique stretching to be increased, and the asymmetrical bowing is increased. In the conventional technology, it is impossible to reduce the increased asymmetrical bowing over the width direction. Hence, the configuration of the present embodiment in which the film is asymmetrically heated in the width direction, and thus it is possible to reduce the displacement of the orientation angle caused by bowing is significantly effective for a case where the film is transported within the speed range described above.

With respect to an evaluation using a cellulose film, the cellulose film was produced in the following method, the stretched film, the circular polarizing plate and the organic EL image display device were produced under the same conditions as in examples 1 to 3 and comparative example 1 and variations in the orientation angle in the width direction were evaluated; the results thereof were the same as those in table 1 where the evaluation was performed using the COP film.

[Method for Manufacturing of Cellulose Ester Film]

<Fine Particle-Dispersed Liquid>

| Fine Particles (Aerosil R927V manufactured by Nippon Aerosil Co., Ltd.) | 11 parts by mass |
|---|---|
| Ethanol | 89 parts by mass |

These were stirred and mixed in a dissolver for 50 minutes, and then dispersion was performed by a Munton Gorlin method.

<Fine Particle-Containing Liquid>

Based on the composition shown below, the above fine particle-dispersed liquid was added slowly into a dissolution tank containing methylene chloride under sufficient stirring. Then, dispersion was performed with an attritor such that the secondary particles had a predetermined size. The product was filtered with a FINEMET NF manufactured by Nippon Seisen Co., Ltd., and thus a fine particle-containing liquid was prepared.

| Methylene chloride | 99 parts by mass |
|---|---|
| Fine particle-dispersed liquid 1 | 5 parts by mass |

<Main Dope Liquid>

A main dope liquid of the composition shown below was prepared. Specifically, first, methylene chloride and ethanol were added into a pressurized dissolution tank. Then, cellulose acetate was added into the pressurized dissolution tank containing the solvent under stirring. The solution was heated, stirred to complete dissolution, and filtered by use of Azumi filter paper No. 244 manufactured by Azumi Filter Paper Co., Ltd., and thus the main dope liquid was prepared. As a sugar ester compound and an ester compound, those synthesized according to an example of synthesis noted below were used. As compound (B), one noted below was used.

(Composition of Main Dope Liquid)

| | |
|---|---|
| Methylene chloride | 340 parts by mass |
| Ethanol | 64 parts by mass |
| Cellulose acetate propionate (with degrees of substitution by acetyl group 1.39 and by propionyl group 0.50, the total degree of substitution 1.89) | 100 parts by mass |
| Compound (B) | 5.0 parts by mass |
| Sugar ester compound | 5.0 parts by mass |
| Ester compound | 2.5 parts by mass |
| Fine Particle-Containing Liquid 1 | 1 part by mass |

[Chemical Formula 7]

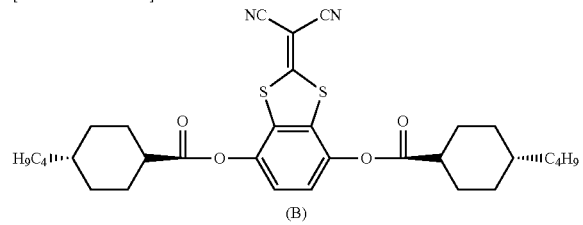

(B)

(Synthesis of Sugar Ester Compound)

A sugar ester compound was synthesized through the following step.

[Chemical Formula 8]

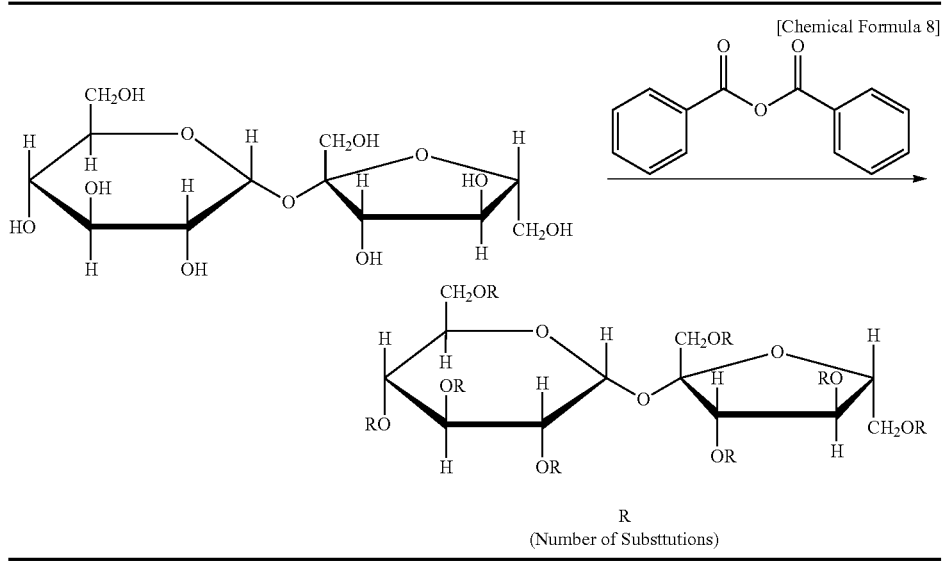

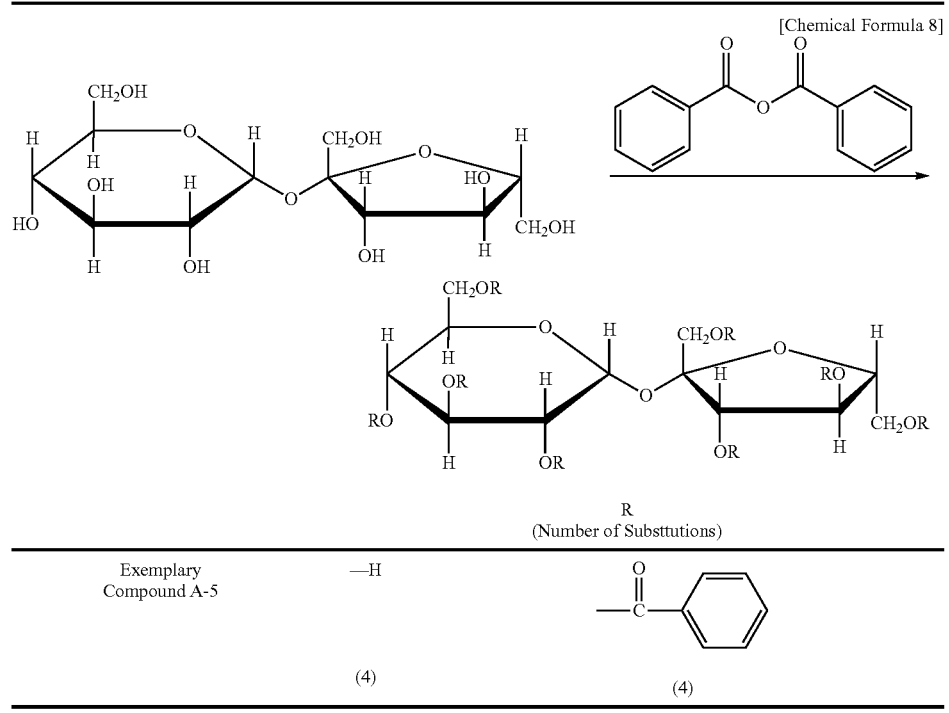

| Exemplary Compound A-5 | —H | ![benzoyl]  |
|---|---|---|
| | (4) | (4) |

A four-necked flask provided with a stirring device, a reflux condenser, a thermometer and a nitrogen gas introduction pipe was charged with 34.2 g (0.1 mol) of sucrose, 180.8 g (0.6 mol) of benzoic anhydride and 379.7 g (4.8 mol) of pyridine. Under stirring, with nitrogen gas bubbling from the nitrogen gas introduction pipe, temperature was raised, and an esterification reaction was performed for five hours at 70° C.

Next, the interior of the flask was depressurized down to $4 \times 10^2$ Pa or less, and excess pyridine was distilled away at 60° C.; then the interior of the flask was depressurized down to $1.3 \times 10$ Pa or less and heated up to 120° C., and the greater part of the benzoic anhydride and of the benzoic acid produced was distilled away.

Lastly, 100 g of water was added to the isolated toluene layer, which was then washed with the water for 30 minutes at room temperature; then the toluene layer was isolated, and the toluene was distilled away under reduced pressure ($4 \times 10^2$ Pa or less), at 60° C. Thus, a mixture of compounds A-1, A-2, A-3, A-4 and A-5 (sugar ester compounds) were obtained.

The obtained mixture was analyzed by HPLC and LC-MASS, and it was found that the content of A-1 was 1.3% by mass, the content of A-2 was 13.4% by mass, the content of A-3 was 13.1% by mass, the content of A-4 was 31.7% by mass and the content of A-5 was 40.5% by mass. The average degree of substitution was 5.5.

(Measurement Conditions for HPLC-MS)
1) LC Part
Equipment: a column oven (JASCO CO-965), a detector (JASCO UV-970-240 nm), a pump (JASCO PU-980) a degasser (JASCO DG-980-50), all manufactured by JASCO Corporation.
Column: Inertsil ODS-3, particle diameter 5 μm, 4.6×250 mm (manufactured by GL Sciences Inc.)
Column Temperature: 40° C.
Flow Rate: 1 ml/min
Movement Phase: TFH (1% acetic acid):$H_2O$ (50:50)
Injected Volume: 3 μl
2) MS Part
Equipment: an LCQ DECA (manufactured by Thermo Quest Inc.)
Ionization Method: Electrospray Ionization (ESI)
Spray Voltage: 5 kV
Capillary Temperature: 180° C.
Vaporizer Temperature: 450° C.

(Synthesis of Ester Compounds)

An ester compound was synthesized through the following step.

A 2 L four-necked flask provided with a thermometer, a stirrer, and a bulb condenser was charged with 251 g of 1,2-propylene glycol, 278 g of phthalic anhydride, 91 g of adipic acid, 610 g of benzoic acid and 0.191 g of tetraisopropyl titanate as an esterization catalyst, and the mixture was heated gradually under stirring in a stream of gaseous nitrogen until the temperature reached 230° C. A dehydration condensation reaction was performed for 15 hours, and after the completion of the reaction, unreacted 1,2-propylene glycol was distilled away at 200° C. under reduced pressure. Thus, an ester compound was obtained. The ester compound had an ester of benzoic acid at an end of a polyester chain formed by condensation of 1,2-propylene glycol, phthalic anhydride and adipic acid. The ester compound had an acid number of 0.10 and a number average molecular weight of 450.

(Flow Casting of the Dope Liquid)

The above composition was put in a sealed container and was dissolved under stirring to prepare the dope liquid. Next, on an endless belt flow casting machine, the above dope liquid was evenly flow-cast with a width of 1000 mm on a stainless steel belt support member. On the stainless steel belt support member, the solvent was evaporated until the residual amount of solvent in the flow-cast film was 75%, and then the film was released from the stainless steel belt support member.

The released cellulose ester film was stretched by a factor of 1.1 in the width direction on a lateral-stretching tenter. The temperature conditions in the lateral-stretching tenter oven at that time were adjusted as follows: 160° C. in the pre-heating zone, 165° C. in the stretching zone, 172° C. in the holding zone and 110° C. in the cooling zone.

Next, both end portions of the film where marks of the tenter clips are left are trimmed off; then at a drying temperature of 130° C., the long film was transported through the drying zone by use of a large number of rolls to complete drying, and was then wound into a roll in the winding step. In this way, a roll of long film (a full-width long film roll) with a dried film thickness of 75 μm was obtained.

The long film of cellulose resin obtained as described above was obliquely stretched by use of the stretching portion 5 shown in FIG. 4, and thus a long stretched film was obtained. Here, the long stretched film was manufactured under the same conditions as those for the manufacturing of the previously described cycloolefin film except that the film movement speed was 30 m/minute, the temperature in the preheating zone Z1 was 187° C., the temperature in the stretching zone Z2 was 185° C., the temperature in the heat-fixing zone Z3 was 170° C., the stretching factor was 2.0 so that the thickness was 52 μm and that the final film width after trimming was 1500 mm.

INDUSTRIAL APPLICABILITY

The present invention can be useful in manufacturing an obliquely stretched long film applied to a circular polarizing plate for external light reflection prevention in an organic EL image display device.

LIST OF REFERENCE SYMBOLS 1 manufacturing system
2 film dispensing portion
5 stretching portion
11 heating portion (first heating portion, second heating portion)
Bo bowing
Ci holding member
Co holding member
F0 center portion
F1 end portion (end portion on preceding side)
F2 end portion (end portion on delayed side)
R1 region
R2 region
Z heating zone
Z1 preheating zone
Z2 stretching zone

The invention claimed is:

1. A method of manufacturing a stretched film, the method comprising:
an oblique stretching step of transporting a film with a preceding side in a width direction moved relatively in a preceding manner and a delayed side in a width direction moved relatively in a delayed manner so as to stretch the film in an oblique direction with respect to the width direction,
wherein the method of manufacturing a stretched film includes a step of heating the film in the width direction such that a temperature distribution is asymmetrical with respect to a center line in the width direction and that bowing produced asymmetrically in the width direction by stretching the film in the oblique direction is reduced, and
the heating is performed such that a position where a temperature in the temperature distribution in the width direction of the film at a time of the heating is maximized is present between a center portion in the width direction and one of end portions on the preceding side and the delayed side, and such that a temperature in the one of ends portions is lower than a temperature in the center portion.

2. The method of manufacturing a stretched film according to claim 1,
wherein the method of manufacturing a stretched film includes:
a preheating step which is arranged on an upstream side with respect to the oblique stretching step and in which the film is transported with both ends of the film held until the oblique stretching step; and
a heat-fixing step which is arranged on a downstream side with respect to the oblique stretching step and in which the film is transported with the both ends of the film held after the oblique stretching step, and
the asymmetrical heating step is performed in at least either of the preheating step and the heat-fixing step.

3. The method of manufacturing a stretched film according to claim 2,
wherein the asymmetrical heating step is performed in at least the heat-fixing step.

4. The method of manufacturing a stretched film according to claim 3,
wherein in the asymmetrical heating step performed in the heat-fixing step, the film is heated such that the position where the temperature in the temperature distribution is maximized in the width direction of the film at the time of the heating is present between the center portion in the width direction and the end portion on the preceding side in the oblique stretching step.

5. The method of manufacturing a stretched film according to claim 2,
wherein the asymmetrical heating step is performed in at least the preheating step.

6. The method of manufacturing a stretched film according to claim 5,
wherein in the asymmetrical heating step performed in the preheating step, the film is heated before stretching of the film such that the position where the temperature in the temperature distribution is maximized in the width direction of the film at the time of the heating is present between the center portion in the width direction and the end portion on the delayed side in the oblique stretching step.

7. The method of manufacturing a stretched film according to claim 2,
wherein the asymmetrical heating step is performed both in the preheating step and in the heat-fixing step.

8. The method of manufacturing a stretched film according to claim 7,
wherein in the asymmetrical heating step performed in the heat-fixing step, the film is heated such that the position where the temperature in the temperature distribution is maximized in the width direction of the film at the time of the heating is present between the center portion in the width direction and the end portion on the preceding side in the oblique stretching step, and
in the asymmetrical heating step performed in the preheating step, the film is heated before stretching of the film such that the position where the temperature in the temperature distribution is maximized in the width direction of the film at the time of the heating is present between the center portion in the width direction and the end portion on the delayed side in the oblique stretching step.

9. The method of manufacturing a stretched film according to claim 1,
wherein the both end portions of the film in the width direction are held with holding members, the film is transported while the holding members are being moved, a direction in which the film is transported is changed partway such that the film is stretched in the oblique direction with respect to the width direction.

10. The method of manufacturing a stretched film according to claim 1,
wherein the film is obliquely stretched while being transported at a speed of 15 m/min to 150 m/min.

11. A device for manufacturing a stretched film, the device comprising:
an oblique stretching portion that transports a film with a preceding side in a width direction moved relatively in a preceding manner and a delayed side in the width direction moved relatively in a delayed manner so as to be able to stretch the film in an oblique direction with respect to the width direction,
wherein the device for manufacturing a stretched film includes:
a preheating portion which is arranged on an upstream side with respect to the oblique stretching portion and in which the film can be transported with both ends of the film held until the oblique stretching portion;
a heat-fixing portion which is arranged on a downstream side with respect to the oblique stretching portion and in which the film can be transported with the both ends of the film held after the oblique stretching portion; and
a heating portion that is provided in at least one of the preheating portion and the heat-fixing portion, and that can heat the film in the width direction such that a temperature distribution is asymmetrical with respect to a center line in the width direction and that bowing produced asymmetrically in the oblique stretching portion can be reduced, and
the heating portion is arranged such that a position where a temperature in the temperature distribution of the film in the width direction at a time of the heating is maximized is present between a center portion in the width direction and one of end portions on the preceding side and the delayed side and such that a temperature in the one of end portions is lower than a temperature in the center portion.

12. The device for manufacturing a stretched film according to claim 11,
wherein the heating portion that can asymmetrically perform the heating is provided in at least the heat-fixing portion.

13. The device for manufacturing a stretched film according to claim 12,
wherein the heating portion provided in the heat-fixing portion is arranged in a position which allows the film to be heated such that the position where the temperature in the temperature distribution is maximized in the width direction of the film at the time of the heating is present between the center portion in the width direction and the end portion on the preceding side in the oblique stretching portion.

14. The device for manufacturing a stretched film according to claim 11,
wherein the heating portion that can asymmetrically perform the heating is provided in at least the preheating portion.

15. The device for manufacturing a stretched film according to claim 14,
wherein the heating portion provided in the preheating portion is arranged in a position which allows the film to be heated such that the position where the temperature in the temperature distribution is maximized in the width direction of the film at the time of the heating is present between the center portion in the width direction and the end portion on the delayed side in the oblique stretching portion.

16. The device for manufacturing a stretched film according to claim 11,
wherein the heating portion that can asymmetrically perform the heating is provided both in the preheating portion and in the heat-fixing portion.

17. The device for manufacturing a stretched film according to claim 16,
wherein the heating portion provided in the preheating portion is arranged in a position which allows the film to be heated such that the position where the temperature in the temperature distribution is maximized in the width direction of the film at the time of the heating is present between the center portion in the width direction and the end portion on the delayed side in the oblique stretching portion, and
the heating portion provided in the heat-fixing portion is arranged in a position which allows the film to be heated such that the position where the temperature in the temperature distribution is maximized in the width direction of the film at the time of the heating is present between the center portion in the width direction and the end portion on the preceding side in the oblique stretching portion.

18. The device for manufacturing a stretched film according to claim 11,
wherein the both end portions of the film in the width direction are held with holding members, the film is transported while the holding members are being moved, a direction in which the film is transported is changed partway such that the film can be stretched in the oblique direction with respect to the width direction.

19. A system for manufacturing a stretched film, the system comprising:
the device for manufacturing a stretched film according to claim 11;
a film dispensing portion that dispenses a film which is a target of stretching to the device for manufacturing a stretched film; and
a winding portion that winds the stretched film obtained by the device for manufacturing a stretched film.

20. The method of manufacturing a stretched film according to claim 1,
wherein a temperature in the one of the end portions in the width direction, in which the position where the temperature in the temperature distribution in the width direction is maximized with respect to the center portion in the width direction is present, is higher than a temperature in the other of the end portions.

21. The method of manufacturing a stretched film according to claim 1,
wherein, in the step of heating the film asymmetrically in the width direction, the film is heated with a heating portion arranged only between the center portion in the width direction and the one of the end portions.

\* \* \* \* \*